United States Patent
Usami et al.

(10) Patent No.: US 6,822,757 B1
(45) Date of Patent: Nov. 23, 2004

(54) COLOR TRANSFORMATION METHOD, COLOR TRANSFORMATION PROGRAM, AND RECORDING MEDIUM RECORDED A COLOR TRANSFORMATION PROGRAM

(75) Inventors: Yoshinori Usami, Kanagawa (JP); Shin Nakata, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/335,729

(22) Filed: Jun. 18, 1999

(30) Foreign Application Priority Data

Jun. 19, 1998 (JP) .......................................... 10-172966

(51) Int. Cl.[7] .................................................. G03F 3/08
(52) U.S. Cl. ..................................... 358/1.9; 358/3.09
(58) Field of Search ............................. 358/1.9, 3.09, 358/515–519, 520; 382/162–167

(56) References Cited

U.S. PATENT DOCUMENTS

| | | | | |
|---|---|---|---|---|
| 5,619,427 A | * | 4/1997 | Ohkubo | ...................... 358/523 |
| 5,786,908 A | * | 7/1998 | Liang | ........................ 358/518 |
| 5,857,063 A | * | 1/1999 | Poe et al. | ..................... 358/1.9 |
| 6,330,078 B1 | * | 12/2001 | Wang | ......................... 358/1.9 |

FOREIGN PATENT DOCUMENTS

| | | | |
|---|---|---|---|
| JP | 2-136848 | 5/1990 | |
| JP | 7-123279 | 5/1995 | |
| JP | 9-116776 | 5/1997 | |
| JP | 10-142775 | 5/1998 | |
| JP | 11187419 A | * 7/1999 | ............ H04N/9/64 |

* cited by examiner

*Primary Examiner*—Thomas D. Lee
*Assistant Examiner*—Stephen Brinich
(74) *Attorney, Agent, or Firm*—Sughrue Mion, PLLC

(57) ABSTRACT

A first relationship of correspondence from RGB data to colorimetric values is univalently determined by using an sRGB space, i.e., a standard space which is colorimetrically defined, and a second relationship of correspondence from CMYK data to the colorimetric values is determined. After K data among the CMYK data is constrained under a predetermined condition corresponding to saturation and lightness, an inverse relationship of correspondence from the colorimetric values to CMYK data is univalently determined. Further, a forward relationship of correspondence from the RGB data to the CMYK data is determined from the first relationship of correspondence and the inverse relationship of correspondence.

18 Claims, 18 Drawing Sheets

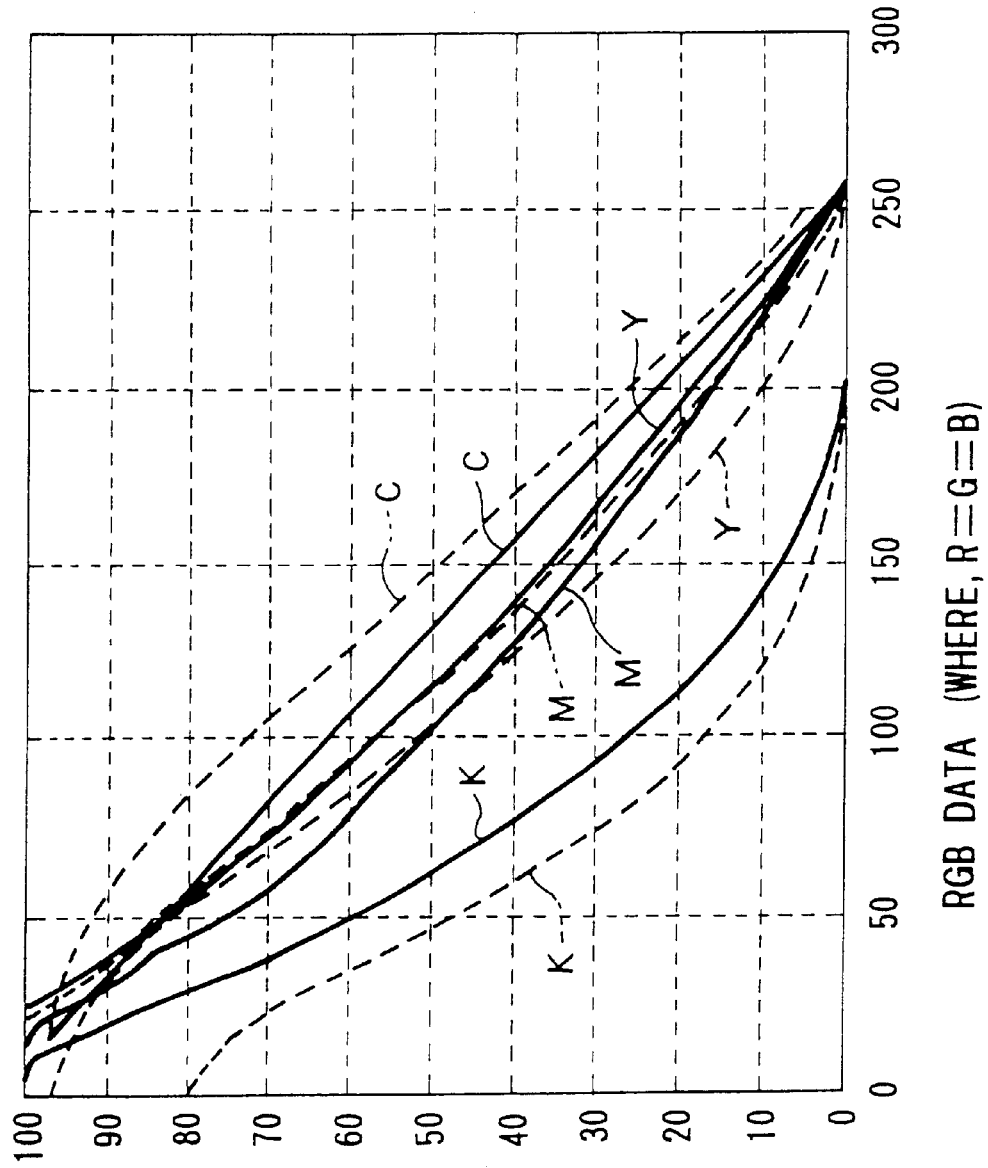

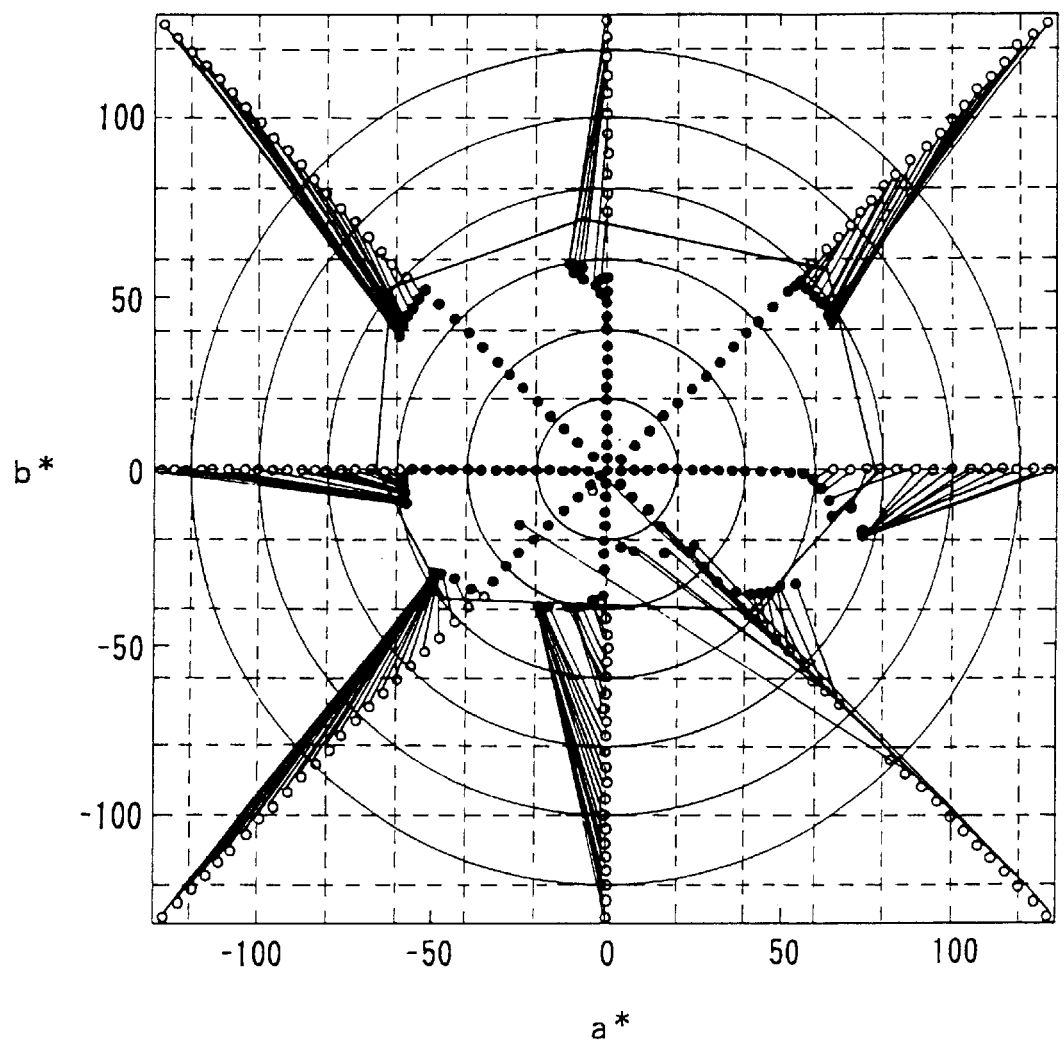
F I G . 1 0

F I G. 1 3
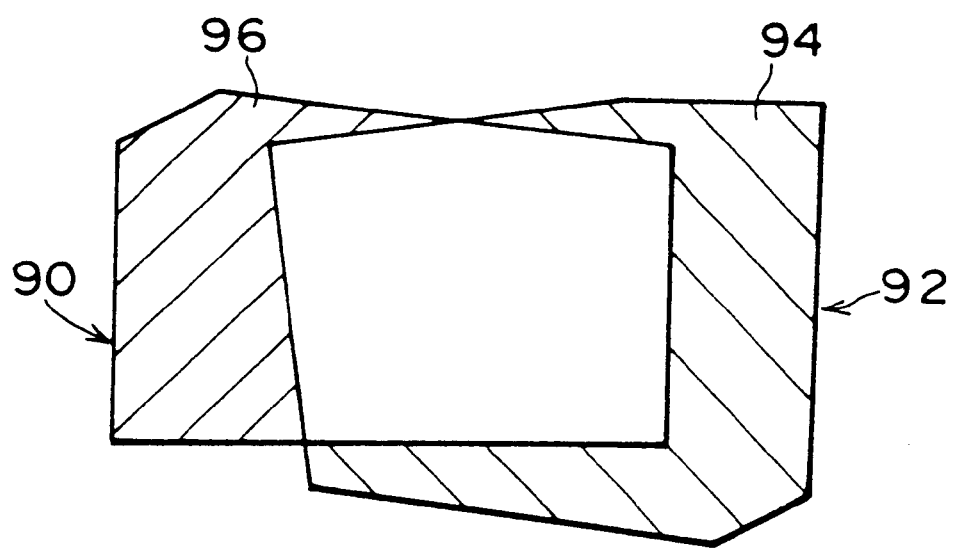

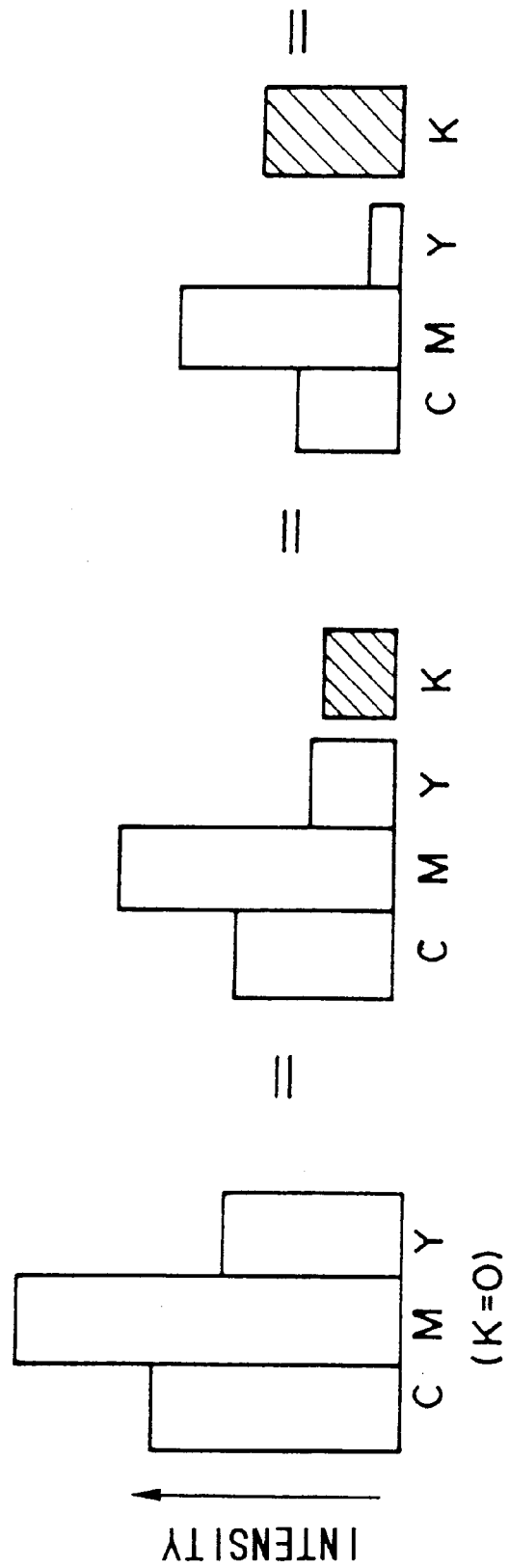

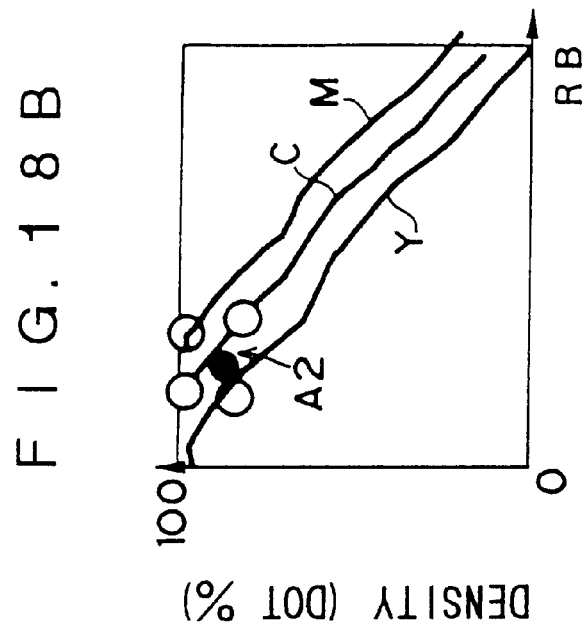
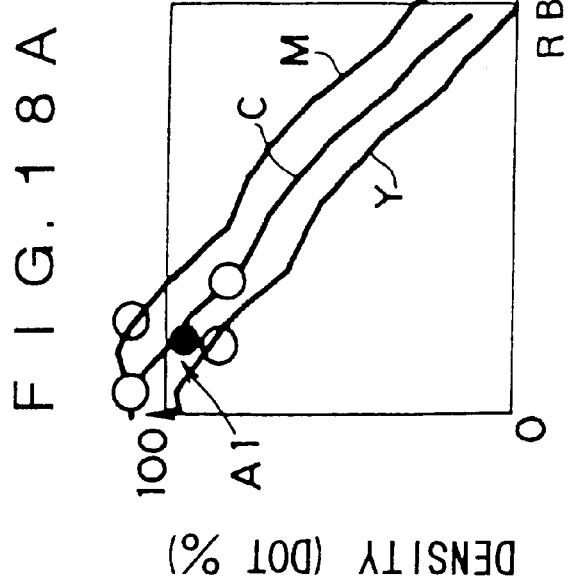

COLOR TRANSFORMATION METHOD, COLOR TRANSFORMATION PROGRAM, AND RECORDING MEDIUM RECORDED A COLOR TRANSFORMATION PROGRAM

BACKGROUND OF THE INVENTION

1. Field of the Invention

The present invention relates to a color transformation method and a recording medium with a color transformation program recorded thereon, and more particularly to a color transformation method for transforming device data in a first device space represented by a first color system into device data in a second device space represented by a second color system different from the first color system, as well as to the recording medium with a color transformation program recorded thereon.

2. Description of the Related Art

In recent years, in conjunction with the consolidation of communication facilities of open networks, in devices such as image displaying devices and printing devices connected to the networks, images are presented by using image source data including color information of other devices. In this case, it is necessary to transform image source data (hereafter referred to as the device data) including color information of the devices between color spaces (hereafter referred to as the device spaces) of the devices. For example, in a case where an image is color printed by using RGB data which is mainly used in image displaying devices, the RGB data must be transformed into CMYK data which is mainly used in the printing devices.

Conventionally, when transforming RGB data to CMYK data, the device spaces of RGB and CMK are temporarily mapped on a generally used color space (hereafter referred to as the colorimetric space) such as an L*a*b* color space or an XYZ color space. Then, a transformation from the RGB device space into the colorimetric space and a transformation from the colorimetric space into the CMYK device space are sequentially effected. Namely, it has been general practice to transform the RGB data into color information in the colorimetric space, and then the color information in the colorimetric space into the CMYK data.

However, the reproducible range, (also known as the gamut), in the colorimetric space, which corresponds to each device space, differs among the respective devices. FIG. 13 shows a conceptual diagram illustrating the configurations and ranges of a gamut 90 of a device space (hereafter called the RGB device space) based on the RGB color system in the colorimetric space and a gamut 92 of a device space (hereafter called the RGB device space) based on the CMYK color system. As shown in FIG. 13, the gamut 90 and the gamut 92 differ from each other.

In a case where data conversion which temporarily undergoes the above-described mapping on the colorimetric space is effected between the RGB device space and the CMYK device space having different gamuts in the colorimetric space, in a forward direction (RGB device space ∋ colorimetric space), the gamut 90 in the RGB device space must be enlarged to a region (a region including both the gamut 90 and the gamut 92) which includes a region 94 which is unnecessary as an actual gamut, whereas, in a reverse direction (colorimetric space ∋ CMYK device space), mapping must be effected on the CMYK device space by including a region 96 which is not required as a gamut in the CMYK device space.

For this reason, it is general practice to subject data corresponding to the gamut 90 and the gamut 92 in FIG. 13 to processing such as space compression, expansion, truncation, and the like, and there is a possibility that reproduction accuracy declines in the case of color reproduced from data subjected to processing such as space compression, expansion, truncation, and the like. In addition, since it is difficult to uniformly effect mapping in the entire gamut of the destination CMYK device space to which the transformation is effected to, there is a possibility that maximum use cannot be made of the gamut of the CMYK device space (i.e., an effective gamut is lost).

In addition, since the device space and the L*a*b* color space do not exhibit complete agreement in discrete sampling characteristics and quantization characteristics, if the conversion which temporarily undergoes mapping on the L*a*b* color space is effected, discontinuous CMYK data is obtained with respect to the RGB data which continues at predetermined intervals, so that there is a possibility that the quality of the image which is printed out deteriorates.

Further, K data has a characteristic that it is equivalently replaced by a gray component which is represented by a predetermined amount of equivalent CMY data, and innumerable CMYK data which are equivalent to one arbitrary piece of CMYK data are present, as shown in FIG. 14. Accordingly, when RGB data is converted to CMYK data, since innumerable combinations of CMYK device space can be obtained, there arises the need to set some restricting conditions on the conversion.

Further in actual printing, the reproduction of color and density must be ensured. In terms of physical properties of printing, the color reproduction characteristic does not necessarily follow an increase in the amount of ink linearly. Namely, the additive process with respect to the amount of ink does not hold, and an unstable gamut is unfailingly present. This is attributable to the fact that there is an upper limit to the ink accepting capacity of printing ink which is a reproducing medium. Therefore, in converting RGB data to CMYK data, it is desirable to develop the gamut by avoiding the aforementioned unstable gamut.

When the RGB device space represented by a monitor or the like is mapped on the CMYK device space peculiar to printing, it is difficult to isochromatically convert all the colors owing to their difference in the gamuts. Accordingly, as general color matching means, various methods shown below in Table 1 are adopted depending on purposes, each having their merits and demerits.

TABLE 1

| Method | What to preserve | White point | Gradation conversion | Within gamut | Outside gamut |
| --- | --- | --- | --- | --- | --- |
| Perceptual | Perceptual relative relation of color | relatively moved | effected | relatively moved | relatively moved |
| Saturation | chroma | relatively moved | effected | preserved | uniform chroma |
| Relative colorimetric | chroma | relatively moved | effected | preserved | closest color |
| Absolute colorimetric | chroma | absolute | not effected | preserved | closest color |

In the perceptual method, all the colors are relatively converted within the gamut, but retention of isochroism with respect to data within the gamut and outside the gamut is not ensured, and in a case where the gamuts of the device space before and after conversion are substantially different, there is a possibility of the atmosphere of the image becoming entirely different due to the conversion. In addition, with respect to the remaining three methods in which measures are devised for mapping for only the region outside the gamut, in the case of the absolute colorimetric method, if the gamuts differ substantially, there is a high possibility that data corresponding to the region outside the gamut is truncated, while in the relative colorimetric system and the saturation method, the continuity of gradation in the target device space is not ensured.

SUMMARY OF THE INVENTION

The present invention has been devised to overcome the above-described problems, and it is an object of the present invention to provide a color transformation method capable of effecting transformation of the device data between different device spaces.

To this end, in accordance with a first aspect of the present invention, there is provided a color transformation method for transforming device data in a first device space represented by a first color system into device data in a second device space represented by a second color system different from the first color system, comprising the steps of: determining a first relationship of correspondence from the device data in the first device space to color information in a third color system different from the first and the second color systems and a second relationship of correspondence from the device data in the second device space to color information of the third color system; determining an inverse relationship of correspondence from the color information of the third color system to the device data in the second device space on the basis of the second relationship of correspondence; determining a forward relationship of correspondence from the device data in the first device space to the device data in the second device space on the basis of the first relationship of correspondence and the inverse relationship of correspondence; and transforming the device data in the first device space into device data in the second device space by using the forward relationship of correspondence determined.

In addition, in accordance with a second aspect of the present invention, there is provided a color transformation method for transforming device data in a first device space represented by an RGB color system into device data in a second device space represented by a CMYK color system different from the RGB color system, comprising the steps of: determining a first relationship of correspondence from the device data in the first device space to color information in a third color system different from the RGB color system and the CMYK color system and a second relationship of correspondence from the device data in the second device space to color information of the third color system; determining an inverse relationship of correspondence from the color information of the third color system to the device data in the second device space on the basis of the second relationship of correspondence after K data of the device data in the second device space is constrained under a predetermined condition; determining a forward relationship of correspondence from the device data in the first device space to the device data in the second device space on the basis of the first relationship of correspondence and the inverse relationship of correspondence; and transforming the device data in the first device space into device data in the second device space by using the forward relationship of correspondence determined.

In addition, in the color transformation method according to the second aspect of the invention, the predetermined condition is a condition that the lower the lightness and saturation of a color corresponding to the color information of the third color system, the more the K data is increased.

The color transformation method in accordance with the above-described first aspect of the invention is a color transformation method for transforming device data in a first device space represented by a first color system into device data in a second device space represented by a second color system different from the first color system. In this color transformation method, a first relationship of correspondence from the device data in the first device space to color information in a third color system different from the first and the second color systems and a second relationship of correspondence from the device data in the second device space to color information of the third color system are first determined.

It should be noted that the first and second relationships of correspondence referred to herein may be functions or lookup tables, for example. As the aforementioned device spaces, it is possible to cite a device space represented by the RGB color system and a device space by the CMYK color system. As the third color system, it is possible to adopt a generally used color space (colorimetric space) such as the L*a*b* color space and the XYZ color space.

In addition, this color transformation method is applicable to a method in which the RGB color system is adopted as the first color system, the CMYK color system is adopted as the second color system, and transformation is effected from RGB data into CMYK data. Conversely, this color transformation method is applicable to a method in which the CMYK color system is adopted as the first color system, the RGB color system is adopted as the second color system, and transformation is effected from CMYK data into RGB data. It goes without saying that the aforementioned CMYK data includes CMYK data (CMY data) in which K data in the CMYK color system is fixed to a predetermined value (e.g., "0").

Next, as an inverse solution of the second relationship of correspondence, an inverse relationship of correspondence from the color information in the third color system to the device data in the second device space is determined. For example, in a case where the relationship can be expressed by a square matrix as in the case of the relationship of correspondence between an sRGB space (which is a standard RGB device space which is univalently made to correspond to the colorimetric space) and the L*a*b* space, the inverse relationship of correspondence is determined simply as an inverse matrix. However, in a case where the relationship of correspondence with the colorimetric space cannot be expressed by a simple matrix as in the case of the CMY device space for printing, the inverse relationship of correspondence is determined by successively obtaining inverse solutions from the second relationship of correspondence.

Here, by applying the device data in the first device space to the aforementioned first relationship of correspondence, it is possible to obtain the color information in the third color system corresponding to the device data in the first device space. In addition, by applying the color information in the third color system thus obtained to the aforementioned inverse relationship of correspondence, it is possible to obtain device data in the second device space corresponding the color information in the third color system. The thus-obtained device data in the second device space is made to correspond to the device data in the aforementioned first device space.

Accordingly, by applying to the inverse relationship of correspondence the color information in the third color system made to correspond to the device data in the first device space by the first relationship of correspondence, device data in the second device space corresponding to the device data in the first device space is obtained, and the forward relationship of correspondence from the deice data in the first device space to the device data in the second device space is determined.

Then, by using the forward relationship of correspondence thus determined, the device data in the first device space is transformed into the device data in the second device space.

Since the aforementioned forward relationship of correspondence represents a direct correspondence from the device data in the first device space to the device data in the second device space, by using this forward relationship of correspondence, the device data in the first device space can be transformed into the device data in the second device space without effecting a transformation which once undergoes mapping on the colorimetric space in the conventional manner.

In addition, since the device data in the first device space is transformed into the device data in the second device space by using the forward relationship of correspondence which has been determined once, conventional processing such as compression, expansion, and truncation of data in the colorimetric space is not performed during the transformation. For this reason, it is possible to prevent a decline in the color reproduction accuracy.

The color transformation method in accordance with the second aspect of the present is a color transformation method in which the RGB color system is adopted as the first color system and the CMYK color system is adopted as the second color system, and device data in the first device space represented by the RGB color system is transformed into device data in the second device space represented by the CMYK color system.

In this color transformation method, a first relationship of correspondence from the device data in the first device space to color information in a third color system and a second relationship of correspondence from the device data in the second device space to color information of the third color system are first determined.

As also described in the column for conventional art, K data has a characteristic that it is equivalently replaced by a gray component which is represented by a predetermined amount of equivalent CMY data, and innumerable CMYK data which are equivalent to one arbitrary piece of CMYK data are present, as shown in FIG. 14. Meanwhile, the CMY data has linear independence in that a color which is represented by one combination of CMY data cannot be represented by another combination of CMY data.

Accordingly, after K data of the device data in the second device space is constrained under a predetermined condition, an inverse relationship of correspondence from the color information of the third color system to the device data in the second device space is determined as an inverse solution of the second relationship of correspondence.

Here, the K data may be fixed to a preset value, or may be set in correspondence with an amount of ink necessary allowing a color corresponding to the color information of the third color system to be reproduced by a printing device. Alternatively, the K data may be determined in correspondence with the lightness or saturation of a color corresponding to the color information of the third color system. Namely, the K data is constrained under the condition that the lower the lightness and saturation of the color corresponding to the color information of the third color system, the more the K data is increased. As a result, since the K data becomes small in the case of a color having high saturation, it is possible to avoid the occurrence of muddiness when a color having high saturation is reproduced. In addition, in the case of a color whose lightness and saturation are low, since the K data becomes large, the color whose lightness and saturation are low can be reproduced stably. Hence, there is an advantage in that the K data can be constrained appropriately in correspondence with the lightness and saturation of the color corresponding to the color information of the third color system.

If the K data is constrained under the predetermined condition in the above-described manner, it is possible to narrow unknown data down to the CMY data, and it is possible to univalently obtain device data in the second device space corresponding to the color information of the third color system. Accordingly, an inverse relationship of correspondence from the color information of the third color system corresponding to the device data (RGB data) in the first device space can be determined univalently. In addition, if the second relationship of correspondence cannot be described by a simple matrix, the inverse relationship of correspondence is determined by successively obtaining inverse solutions from the second relationship of correspondence.

Next, by applying to the inverse relationship of correspondence the color information of the third color system made to correspond to the device data i the first device space by the first relationship of correspondence, device data in the second device space corresponding to the device data in the first device space is obtained, and the forward relationship of correspondence from the device data in the first device space to the device data in the second device space is determined.

Then, by using the forward relationship of correspondence thus determined, the device data in the first device space is transformed into the device data in the second device space.

Since the aforementioned forward relationship of correspondence represents a direct correspondence from the device data in the first device space to the device data in the second device space, by using this forward relationship of correspondence, the device data in the first device space can be transformed into the device data in the second device space without effecting a transformation which once undergoes mapping on the colorimetric space in the conventional manner.

In addition, since the device data in the first device space is transformed into the device data in the second device space by using the forward relationship of correspondence which has been determined once, conventional processing such as compression, expansion, and truncation of data in the colorimetric space is not performed during the transformation. For this reason, it is possible to prevent a decline in the color reproduction accuracy.

In addition, since the K data is constrained, the forward relationship of correspondence expressing a direct correspondence from three-dimensional RGB data to four-dimensional CMYK data can ca determined univalently.

As described above, in accordance with the first and second aspects of the present invention, by using the first relationship of correspondence from the device data in the first device space to the color information of the third color system and the inverse relationship of correspondence from the color information of the third color system to the device data in the second device space, the forward relationship of correspondence expressing a direct correspondence from the device data in the first device space to the device data in the second device space is determined, and the device data in the first device space is directly transformed into the device data in the second device space on the basis of the forward relationship of correspondence. Accordingly, it is possible to prevent the drawback that the color reproduction accuracy declines.

In addition, in accordance with the second aspect of the present invention, since the K data is constricted, the forward relationship of correspondence expressing a direct correspondence from the three-dimensional RGB data to the four-dimensional CMYK data can be determined univalently.

In addition, in accordance with the second aspect of the present invention, if the predetermined condition is a condition that the lower the lightness and saturation of a color corresponding to the color information of the third color system, the more the K data is increased, the K data can be constrained appropriately in correspondence with the lightness and saturation of the color corresponding to the color information of the third color system.

BRIEF DESCRIPTION OF THE DRAWINGS

FIG. 9 is a graph illustrating correspondence from RGB data corresponding to gray to respective data on C, M, Y, and K;

FIG. 10 is a cross-sectional view of $L^*=50$ in the $L^*a^*b^*$ color space, illustrating the relationship of correspondence between the source RGB data and the target CMYK data in accordance with the second embodiment;

FIG. 13 is a diagram illustrating a gamut of the RGB device space and a gamut of a CMYK device space which are mapped on a colorimetric space;

FIG. 14 is a diagram explaining the fact that innumerable CMYK data which are equivalent to an arbitrary piece of CMYK data are present;

FIG. 18A is a diagram illustrating CMYK data A1 corresponding to the point subject to transformation in a case where clip processing is not performed for the lattice points located outside the gamut of the CMYK device space;

FIG. 18B is a diagram illustrating CMYK data A2 corresponding to the point subject to transformation in a case where clip processing is performed for the lattice points located outside the gamut of the CMYK device space;

DESCRIPTION OF THE PREFERRED EMBODIMENTS

First Embodiment

Referring now to the accompanying drawings, a description will be given of a first embodiment relating to a color transformation method in accordance with a first aspect of the present invention.

Figure 1:
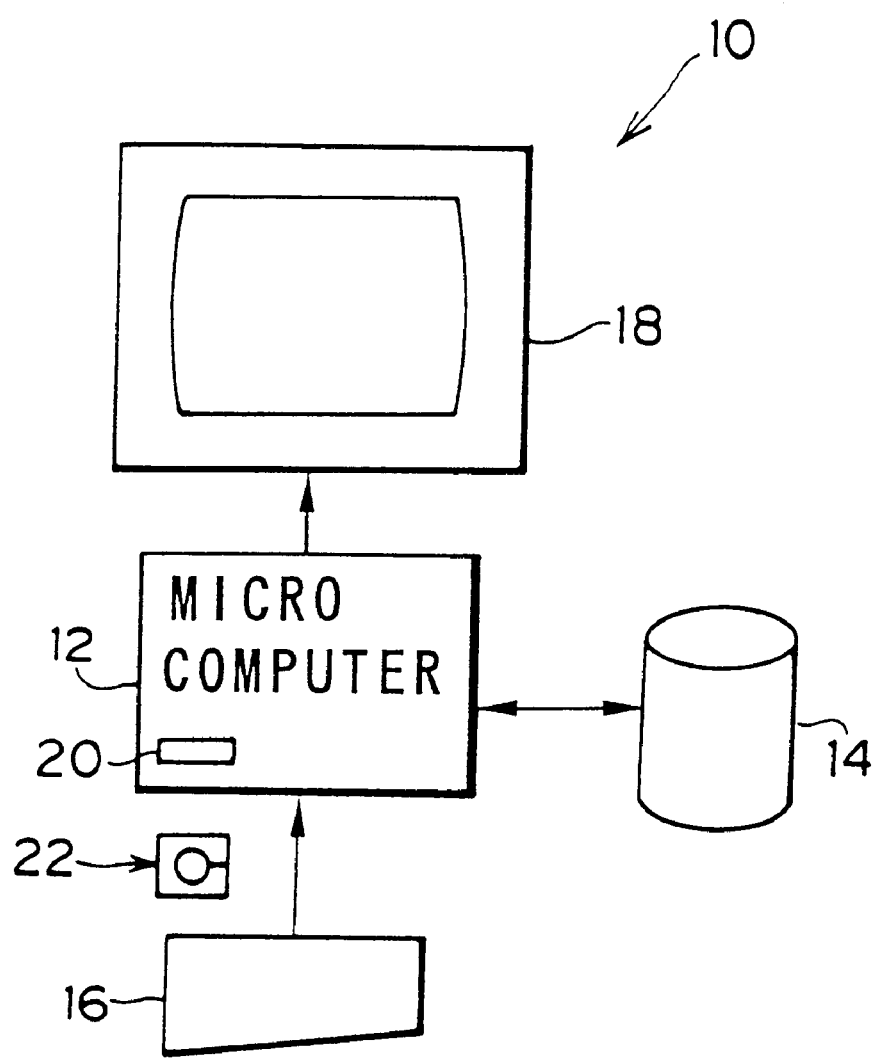
FIG. 1 is a schematic diagram of an image processor in accordance with a first and a second embodiment of the present invention.

FIG. 1 shows a schematic diagram of an image processor 10 for executing color transformation processing based on the color transformation method in accordance with this first embodiment. As shown in FIG. 1, this image processor 10 is comprised of a microcomputer 12 including a CPU, a ROM a RAM, and the like which are not shown; a hard disk 14 in data such as image source data is stored; a keyboard 16 for an operator to input data, commands, and the like; and a display 18 for displaying images, messages, and the like. The microcomputer 12 has a floppy disk drive (FDD) 20, and as a floppy disk 22 is loaded in this FDD 20, a color transformation program, which will be described later, and image data subjected to color transformation processing can be recorded on the floppy disk 22. It should be noted that a network environment may be structured by installing a LAN interface board in the image processor 10 instead of the FDD 20, and transmission and reception of a signal to and from another image processor, a server, a printer, and the like connected to the network may be effected.

Next, referring to the flowchart shown in FIG. 2, a description will be given of color transformation processing (color transformation program) in accordance with the first embodiment. A description will be given below of color transformation processing in which RGB data in an sRGB space is transformed into CMY data in a case where data on K is set to 0 in the CMYK color system (hereafter, this data will be referred to as CMY data).

Figure 2:
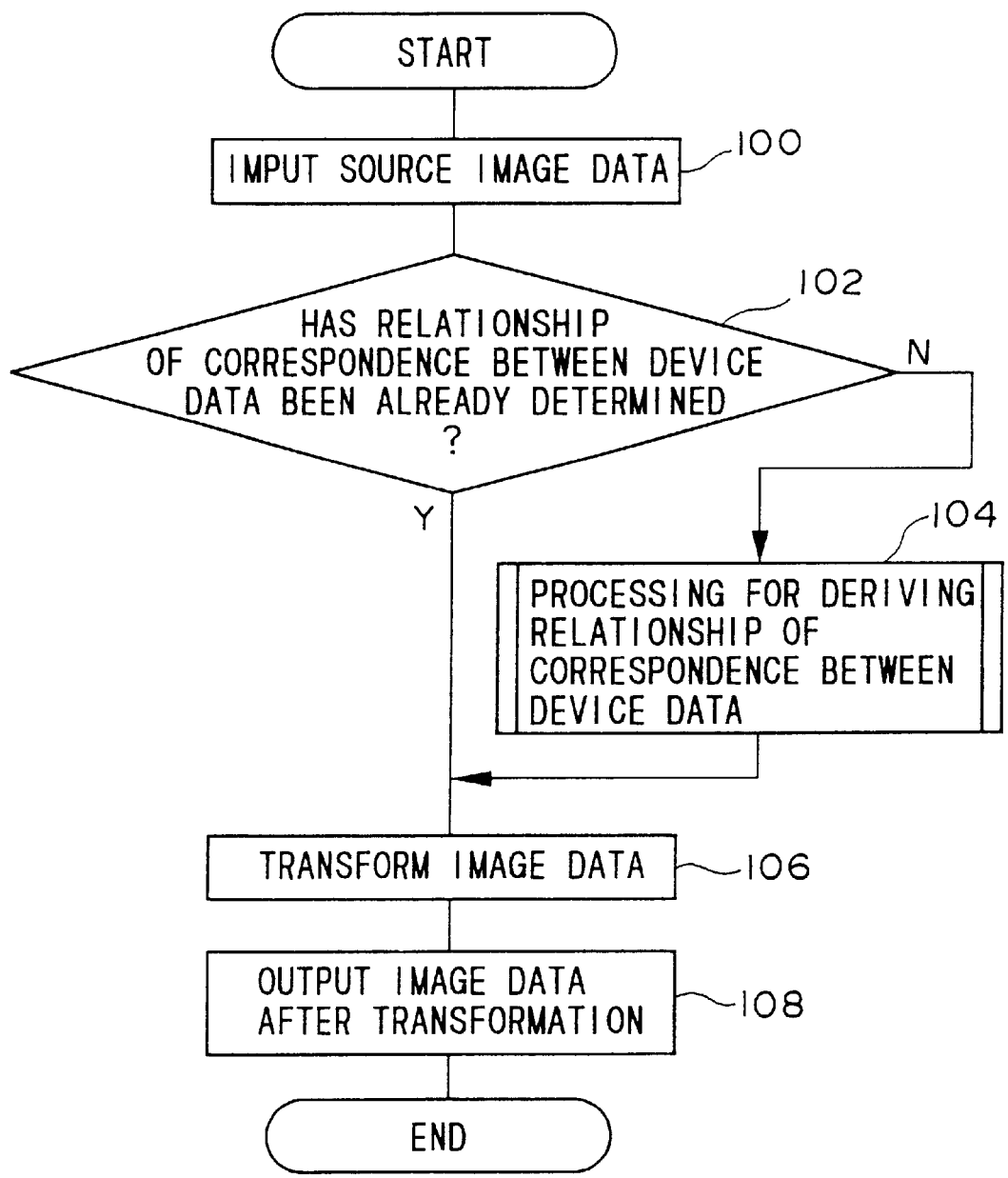
FIG. 2 is a flowchart illustrating a main routine of color transformation processing in the first and second embodiments.

When the operator designates RGB data subject to transformation processing, e.g., a color image, by using the keyboard 16, and instructs the starting of color transformation processing by a predetermined operation, the control routine shown in FIG. 2 is executed by the microcomputer 12.

In Step 100 of FIG. 2, the RGB data designated above, i.e., the image data to be transformed from, is read from the hard disk 14. In an ensuing Step 102, a determination is made as to whether or not a relationship of correspondence between the source device data and the target device data has already been determined. Here, if the relationship of correspondence has not been determined, the operation proceeds to Step 104 to execute processing (FIG. 3) for deriving the relationship of correspondence between the device data, which will be described below.

In Step 120 of FIG. 3, a first relationship of correspondence from the RGB data to color information of a predetermined colorimetric space (hereafter, this color information will be referred to as colorimetric values), as well as a second relationship of correspondence from the CMY data to the colorimetric values, are determined as follows. Here, a description will be given by using an example in which XYZ data in the XYZ color space is used.

In a standard space which is colorimetrically defined by the sRGB space, the RGB data and the colorimetric values XYZ can be made to correspond to each other univocally by a determinant in the formula given below. Accordingly, the respective data in the RGB device space of a display, i.e., a standard space which is generally defined colorimetrically, can be made to correspond to the colorimetric values XYZ.

$$\begin{bmatrix} X \\ Y \\ Z \end{bmatrix} = \begin{bmatrix} 0.4123 & 0.3574 & 0.1804 \\ 0.2126 & 0.7151 & 0.0721 \\ 0.0190 & 0.1181 & 0.9504 \end{bmatrix} \begin{bmatrix} R \\ G \\ B \end{bmatrix} \quad (1)$$

Figure 15A:
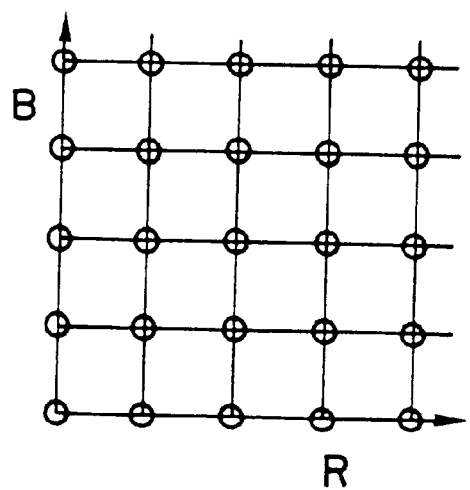
FIG. 15A is a diagram explaining lattice points which are set in the RGB device space.

In this Formula (1), all the RGB device data is transformed into XYZ data by using Formula (1) Specifically, the XYZ data is calculated from Formula (1) above with respect to the respective RGB data corresponding to the following points (lattice points) which are continuously located at predetermined intervals in directions parallel to an R-axis, a G-axis, and a B-axis in the RGB device space. If the RGB device space is projected in the G-axis direction, the aforementioned lattice points are those which correspond to unfilled circles in an RB two-dimensional coordinate system shown in FIG. 15A, and are distributed similarly in a GB two-dimensional coordinate system and an RB two-dimensional coordinate system as well.

In an ensuing Step 122, a relationship of correspondence from the CMY data to the XYZ data is determined. Although the RGB data is shown colorimetrically in Step 120 above, as a formula which colorimetrically represents CMY data, i.e., the reproduction characteristic in printing, it is possible to cite an additive linear combination formula (Formula (2) below) which is known as the Neugebauer's formula.

The Neugebauer's formula represents colors to be reproduced in the form of a simple linear combination formula with respect to a discretely continuous dot area ratio of CMYK. In the above model, the average frequency (probability) of appearance is determined with respect to all the multiplied colors which can possibly appear when only C, M, and Y are used, and addition is performed by weighting the average frequency of appearance by the intensity of each color, thereby making the CMY data correspond to the XYZ data. It should be noted that $[W_x, W_y, W_z, C_x, C_y, C_z, \ldots]$ in Formula (2) above represent colorimetric values of the respective appearing color components, and $[c, m, y, cm, \ldots]$ represent the frequencies of appearance (probabilities) of the respective color components.

All the CMY device data is transformed into XYZ data by using Formula (2) above. Specifically, in the same way as in Step 120, the XYZ data is calculated from Formula (2) above with respect to the respective CMY data corresponding to the points (lattice points) which are continuously located at predetermined intervals along a C-axis, an M-axis, and a Y-axis in the CMYK device space, thereby determining the second relationship of correspondence from the CMY data to the XYZ data.

It should be noted that the relationship of correspondence from the CMY data to the XYZ data can be described by making use of polynomials or other interpolation methods other than the additive linear combination formula such as the one described above, and the present invention is not limited to the use of the additive linear combination formula.

Next, in Step 124, inverse solutions are successively determined from the second relationship of correspondence, thereby an inverse relationship of correspondence from the colorimetric values to the CMY data. Namely, in a case where the data cannot be represented by a simple matrix with respect to the XYZ data as in the case of CMY data in printing, it is the simplest way to obtain inverse solutions successively from the second relationship of correspondence.

Described below is a method in which an inverse relationship of correspondence from the XYZ data to the CMY data is conversely determined from a function expressing the second relationship of correspondence from the CMY data to the XYZ data, by making use of Newton's successive approximation method, for example.

If a mapping function in the forward direction from the CMYK data to the XYZ data is set as G, the relation can be described as shown in Formula (3) below.

$$\begin{bmatrix} X \\ Y \\ Z \end{bmatrix} = \begin{bmatrix} W_x & C_x & M_x & Y_x & CM_x & CY_x & MY_x & CMY_x \\ W_y & C_y & M_y & Y_y & CM_y & CY_y & MY_y & CMY_y \\ W_z & C_z & M_z & Y_z & CM_z & CY_z & MY_z & CMY_z \end{bmatrix} \begin{bmatrix} (1-c)(1-m)(1-y) \\ c(1-m)(1-y) \\ m(1-c)(1-y) \\ y(1-c)(1-m) \\ cm(1-y) \\ cy(1-m) \\ my(1-c) \\ cmy \end{bmatrix} \quad (2)$$

$$\begin{bmatrix} X \\ Y \\ Z \end{bmatrix} = \begin{bmatrix} G_x(CMYK) \\ G_y(CMYK) \\ G_z(CMYK) \end{bmatrix} \quad (3)$$

Here, a colorimetric value increment $G_{dev}$ with respect to an amount of change $C\Delta$ of C, an amount of change $M\Delta$ of M, and an amount of change $Y\Delta$ of Y under the condition in which K data is fixed to "0" is expressed by the following Formula (4):

$$G_{dev} = \frac{(\partial G_x \partial G_y \partial G_z)}{(\partial C \partial M \partial Y)} = \begin{bmatrix} \partial G_x/\partial C & \partial G_x/\partial M & \partial G_x/\partial Y \\ \partial G_y/\partial C & \partial G_y/\partial M & \partial G_y/\partial Y \\ \partial G_z/\partial C & \partial G_z/\partial M & \partial G_z/\partial Y \end{bmatrix} \quad (4)$$

Here, when an attempt is made to determine CMY data corresponding to XYZ data $X_n$, $Y_n$, and $Z_n$, if $C_o$, $M_o$, and $Y_o$ are given as initial values of the CMY data corresponding to the initial values $X_o$, $Y_o$, and $Z_o$ of the XYZ data, the relationship between new CMY data C1, M1, and Y1 after occurrence of infinitesimal change $\Delta C \Delta M \Delta Y$ in the CMY data, on the one hand, and the XYZ data $X_o$, $Y_o$, and $Z_o$, on the other hand, can be expressed by the following formula (5):

$$\begin{bmatrix} C_1 \\ M_1 \\ Y_1 \end{bmatrix} = \begin{bmatrix} C_0 \\ M_0 \\ Y_0 \end{bmatrix} + G_{dev}^{-1} \left\{ \begin{bmatrix} X_0 \\ Y_0 \\ Z_0 \end{bmatrix} - \begin{bmatrix} G_x(CMYK) \\ G_y(CMYK) \\ G_z(CMYK) \end{bmatrix} \right\} \quad (5)$$

As a result, the relationship between CMY data $C_{n+1}$, $M_{n+1}$, and $Y_{n+1}$ and the XYZ data $X_n$, $Y_n$, and $Z_n$ can be expressed by the following Formula (6) in the manner of a recurrent formula:

$$\begin{bmatrix} C_{n+1} \\ M_{n+1} \\ Y_{n+1} \end{bmatrix} = \begin{bmatrix} C_n \\ M_n \\ Y_n \end{bmatrix} + G_{dev}^{-1} \left\{ \begin{bmatrix} X_n \\ Y_n \\ Z_n \end{bmatrix} - \begin{bmatrix} G_x(CMYK) \\ G_y(CMYK) \\ G_z(CMYK) \end{bmatrix} \right\} \quad (6)$$

The closer the CMY data approaches real values, the more the amount of change from the CMY data $C_n$, $M_n$, and $Y_n$, to the CMY data $C_{n+1}$, $M_{n+1}$, and $Y_{n+1}$ becomes infinitesimal.

Accordingly, when the amount of change in the CMY data has become infinitisimal, and a condition of convergence shown by Formula (7) below has become valid, if the calculation of the CMY data is stopped, it is possible to obtain approximate solutions of real values of CMY data. It should be noted that e is a predetermined infinitesimal value for assuming that convergence has been obtained.

$$|(C_n, M_n, \text{ and } Y_n) - (C_{n+1}, M_{n+1}, \text{ and } Y_{n+1})| < \epsilon \quad (7)$$

Next, in Step 126, from the first relationship of correspondence determined in Step 120 and the inverse relationship of correspondence determined in Step 124, the forward relationship of correspondence from the RGB data to the CMY data is determined as follows.

If it is assumed that the function expressing the first relationship of correspondence from the RGB data to the XYZ data is set as F (Formula (8) below), and that the function expressing the second relationship of correspondence from the CMY data to the XYZ data is set as G (Formula (9) below), CMY data corresponding to the RGB data as input values of the function F is obtained by inputting the XYZ data as output values of the function F to the inverse relationship of correspondence (inverse function G').

$$(X, Y, Z) = F(R, G, B) \quad (8)$$

$$(X, Y, Z) = G(C, M, Y) \quad (9)$$

$$(C, M, Y) = G'(X, Y, Z) = G'F((X, Y, Z)) \quad (10)$$

Figure 15B:
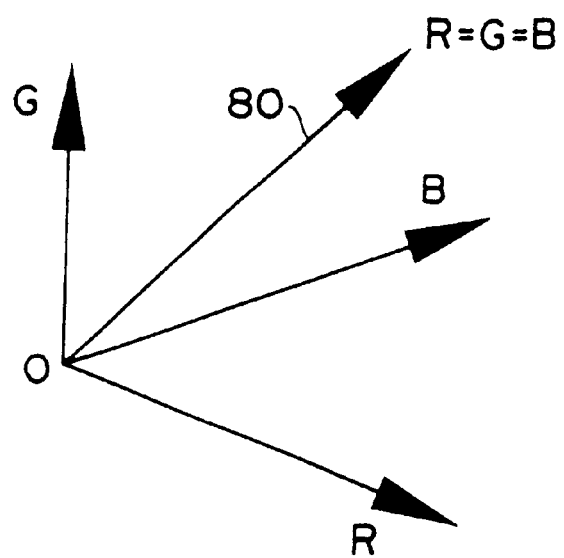
FIG. 15B is a diagram illustrating a gray axis in the RGB device space.

In this embodiment, to effect mapping so as not to impair the continuity of gradation in the device space, by using as a reference an axis (hereafter, referred to as the gray axis) 80 on which R=G=B and which corresponds to an achromatic color in the RGB device space shown in FIG. 15B, in accordance with Formula (10) above corresponding XYZ data is obtained consecutively with respect to the RGB data corresponding to the respective lattice points in a direction substantially parallel to the gray axis 80, from the first relationship of correspondence determined in Step 120. Then, CMY data corresponding to the obtained XYZ data is obtained from the inverse relationship of correspondence determined in Step 124. Thus with respect to the RGB data corresponding to the respective lattice points, the forward relationship of correspondence from the RGB data to the CMYK data is determined.

After the forward relationship of correspondence is thus determined, the operation proceeds to Step 106 in FIG. 2, and the RGB data subject to processing is directly transformed into CMY data by using the forward relationship of correspondence obtained, without undergoing mapping on the colorimetric space. Here, in a case where the RGB data subject to processing is data corresponding to lattice points in the RGB device space, the RGB data is transformed into CMY data which is made to correspond in the forward relationship of correspondence. If the RGB data subject to processing is not data corresponding to lattice points, CMY data corresponding to the subject of processing is determined by interpolation calculation from the CMY data persisting after conversion of eight lattice points located in the vicinities of the point subject to processing in the RGB device space.

In an ensuing Step 108, the transformed image data is stored in the hard disk 14, and is recorded on the floppy disk 22 loaded in the FDD 20. As a result, it becomes possible to input the transformed CMY data to an unillustrated printing device through the floppy disk 22 and print an image. It should be noted the image processor 10 may be connected to a network such as a local area network (LAN), and the transformed CMY data may be transmitted to a printing device or another image processor connected to the network.

If a determination is made in Step 102 that the relationship of correspondence between the source device data and the target device data has already been determined, the operation proceeds to Step 106 in which the relationship of correspondence is read from the hard disk 14, and the RGB data subject to processing is directly transformed into CMY data by using the relationship of correspondence in the same way as described above. Then, in an ensuing Step 108, the transformed image data is stored in the hard disk 14 and is recorded on the floppy disk 22 loaded in the FDD 20.

In accordance with the above-described first embodiment, the RGB data and the colorimetric values XYZ are univalently made to correspond to each other as the first relationship of correspondence by using the sRGB space, i.e. a standard space which is colorimetrically defined, the colorimetric values XYZ and the CMY data are made to correspond to each other as the inverse relationship of correspondence by using Neugebauer's formula, and a forward relationship of correspondence expressing a direct relationship of correspondence from the RGB data to the CMY data is determined by using the first relationship of correspondence and the inverse relationship of correspondence. Therefore, by using the forward relationship of correspondence, the RGB data subject to processing can be directly transformed into CMY data while retaining colorimetric isochroism.

In addition, since the RGB data is transformed into the CMY data in Step 106 by using the forward relationship of correspondence which has been determined once, the RGB data is transformed into the CMY data in Step 106, conventional processing such as compression, expansion, and truncation of data in the colorimetric space is not performed during transformation of the RGB data. For this reason, it is possible to improve the efficiency in transformation processing and prevent a decline in the color reproduction accuracy.

Second Embodiment

Next, a description will be given of a second embodiment of the color transformation method in accordance with a second aspect of the present invention. In this second embodiment, a description will be given of color transformation processing in which RGB data in the RGB device space is transformed into CMY data in the CMYK color system. It should be noted that since the configuration of the image processor is similar to that of the first embodiment, a description thereof will be omitted.

Figure 7B:
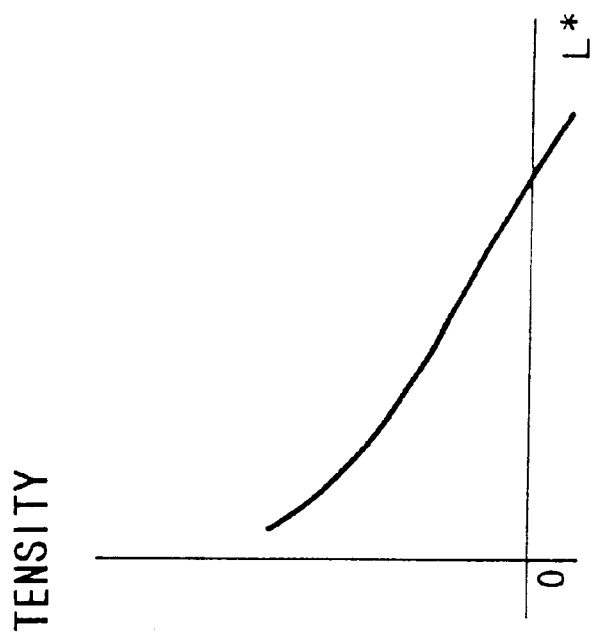
FIG. 7B is a graph illustrating a weighting function in which the lower the lightness, the higher the value of its weighting coefficient.
Figure 7A:
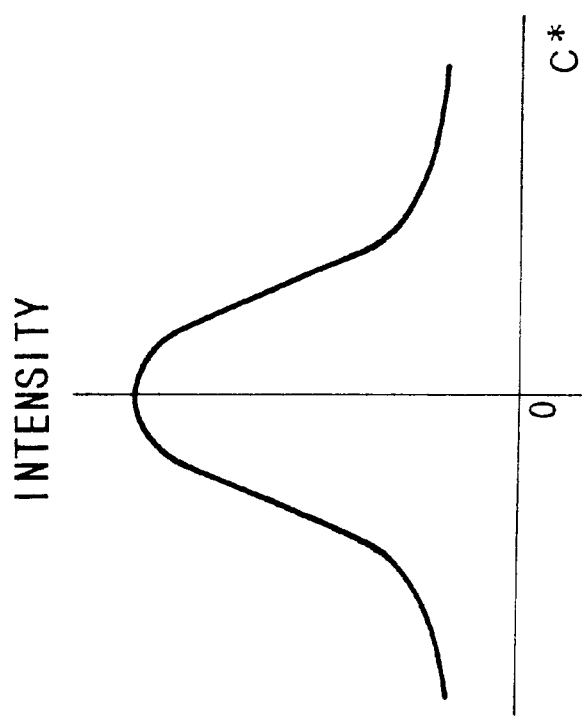
FIG. 7A is a graph illustrating a weighting function illustrating a Gaussian distribution with respect to saturation.

However, information on a first weighting coefficient which changes in accordance with the saturation C* of a color to be reproduced and which is used in K data determination process, which will be described later, is stored in advance in the hard disk in FIG. 1 in correspondence with saturation C*. In addition, information on a second weighting coefficient which changes in accordance with the lightness L* of a color to be reproduced is also stored in advance therein in correspondence with lightness L*. It should be noted that the first weighting coefficient is set such that, as shown in FIG. 7A, its value is maximal when the saturation C* of the color to be reproduced is 0 (when it is gray), and its value becomes smaller as the absolute value of saturation C* becomes larger (e.g., in such a manner as to assume a Gaussian distribution). The second weighting coefficient is set such that the lower the lightness L* of the color, the larger its value becomes.

Outline of Color Transformation Processing

Next, a description will be given of an outline of color transformation processing in accordance with this second embodiment. When the operator designates RGB data subject to transformation processing, e.g., a color image, by using the keyboard 16, and instructs the starting of color transformation processing by a predetermined operation, the control routine (color transformation program) shown in FIG. 2 is executed by the microcomputer 12. It should be noted that, in this second embodiment, since only Step 104 in FIG. 2 differs from the first embodiment, a description will be given below of processing for deriving the relationship of correspondence between device data in Step 104 with reference to the flowchart shown in FIG. 4.

Figure 3:
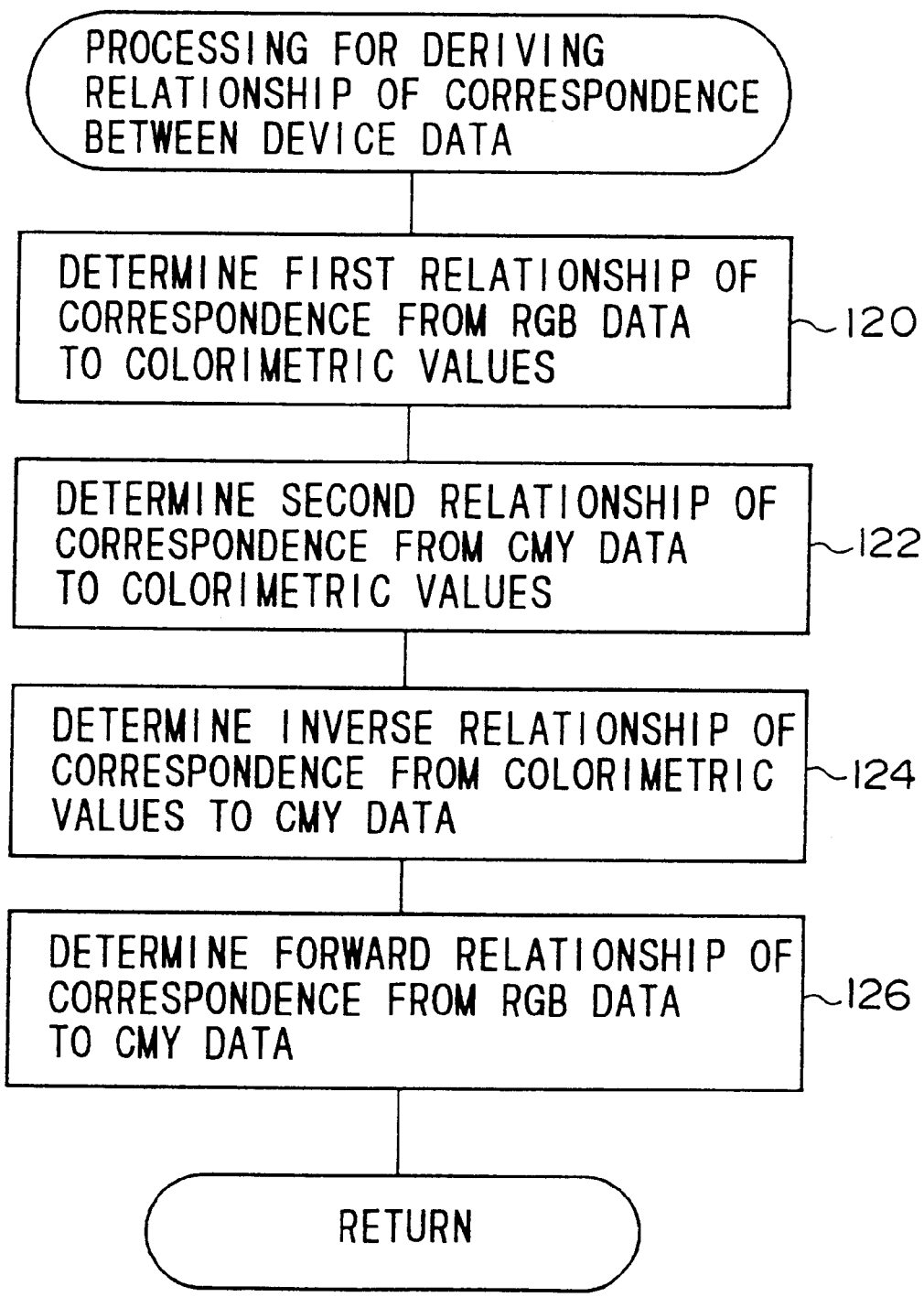
FIG. 3 is a flowchart illustrating a subroutine for processing for deriving a relationship of correspondence between device data in the first embodiment.
Figure 4:
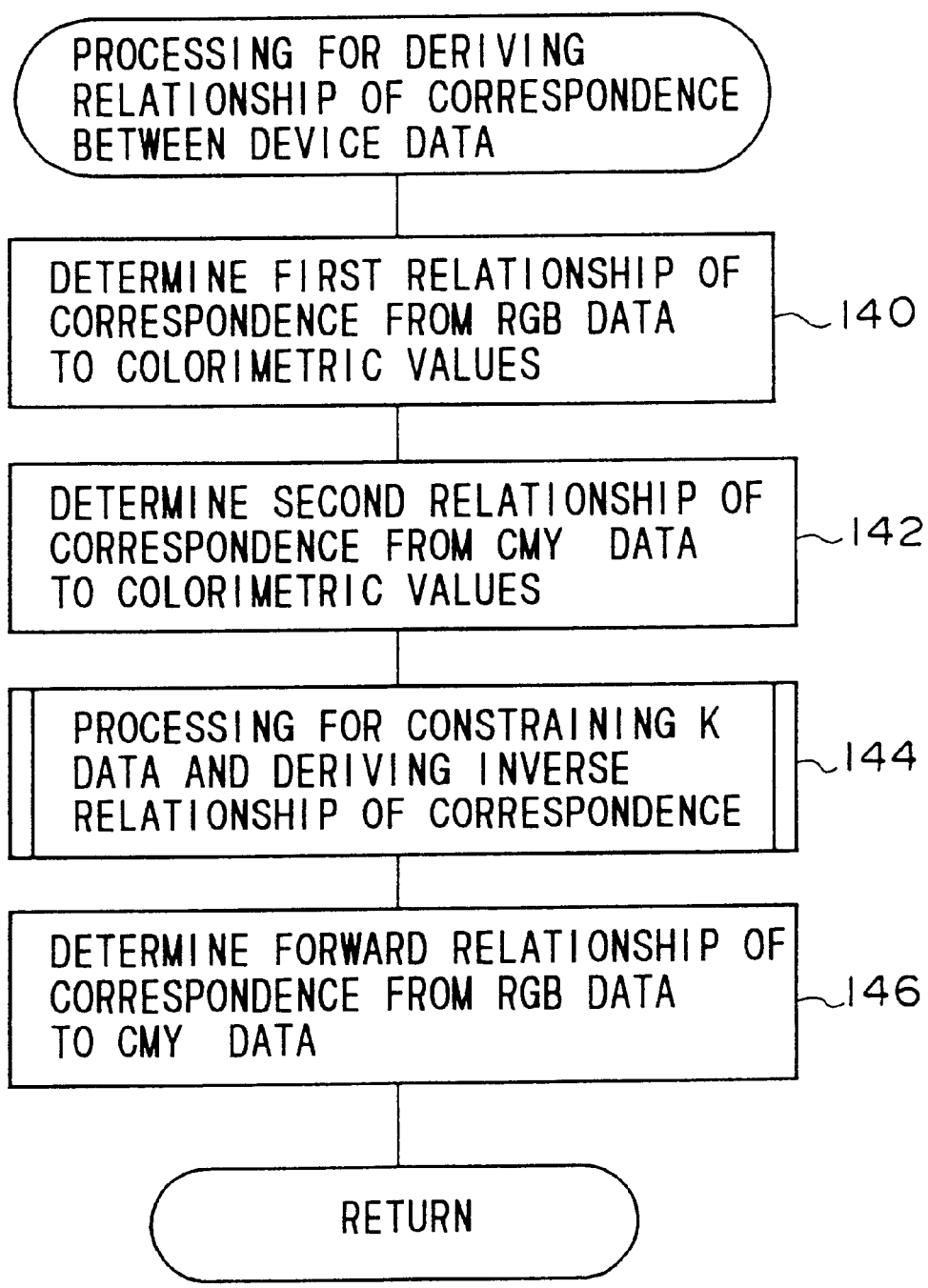
FIG. 4 is a flowchart illustrating a subroutine for processing for deriving a relationship of correspondence between device data in the second embodiment.

In Step 140 of FIG. 4, in the same way as in Step 120 of FIG. 3 referred to above, the first relationship of correspondence from the RGB data to colorimetric values is determined. In an ensuing Step 142, in the same way as in Step 122 in FIG. 3 referred to above, the second relationship of correspondence from the CMYK data to the colorimetric values is determined. Incidentally, as the colorimetric values, XYZ data represented by the XYZ color space may be adopted, or L*a*b* data represented by the L*a*b* color space may be adopted.

In an ensuing Step 144, a subroutine for restricting for constraining K data and deriving an inverse relationship of correspondence, which will be described later, is executed. Here, the inverse relationship of correspondence from the colorimetric values to the CMYK data is determined after K data is constrained under a predetermined condition corresponding to a colorimetric values. Namely, since the K data is constrained, CMYK data corresponding to colorimetric values are obtained by successively determining inverse solutions from the second relationship of correspondence by making use of Newton's successive approximation method or the like in the same way as the above-described first embodiment.

In an ensuing Step 146, the forward relationship of correspondence from the RGB data to the CMYK data is determined in the manner described below from the first relationship of correspondence determined in Step 140 and the inverse relationship of correspondence determined in Step 144.

For example, in a case where L*a*b* data is used as colorimetric values, if it is assumed that the function expressing the first relationship of correspondence from the RGB data to the L*a*b* data is F, and that the function expressing the second relationship of correspondence from the CMYK data to the L*a*b* data is G, the relationship between the data can be expressed by the following Formulae (11) and (12):

$$(L^*, a^*, b^*) = F(R, G, B) \tag{11}$$

$$(L^*, a^*, b^*) = G(C, M, Y, K) \tag{12}$$

Here, as is apparent from Formula (13) below, if the L*a*b* data as output values of the function F is inputted to the inverse relationship of correspondence (inverse function G'), CMYK data corresponding to the RGB data as input values of the function F can be obtained.

$$(C, M, Y, K) = G'(L^*, a^*, b^*) = G'(F(R, G, B)) \tag{13}$$

In this second embodiment, to effect mapping so as not to impair the continuity of gradation in the device space, by using as a reference the gray axis 80 on which R=G=B and which corresponds to an achromatic color in the RGB device space shown in FIG. 15B, in accordance with Formula (13) above corresponding L*a*b* data is obtained consecutively with respect to the RGB data corresponding to the respective lattice points in a direction substantially parallel to the gray axis 80, from the first relationship of correspondence determined in Step 140. Then, CMYK data corresponding to the obtained L*a*b* data is obtained from the inverse relationship of correspondence determined in Step 144. Thus with respect to the RGB data corresponding to the respective lattice points, the forward relationship of correspondence from the RGB data to the CMYK data is determined.

Figure 16:
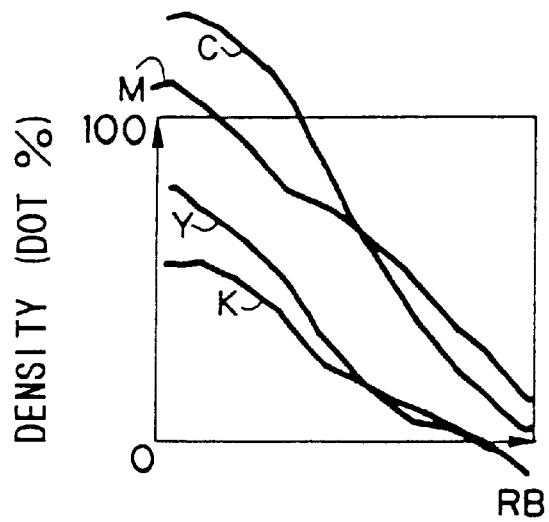
FIG. 16 is a graph showing correspondence between RB data and CMYK data in a case where G data is fixed to a predetermined value in the RGB data.

FIG. 16 shows one example of the relationship of correspondence of the CMYK data with respect to the RB data (R data×B data) in a case where G data is fixed to a predetermined value in the RGB data. As shown in FIG. 16, there are cases where one of the CMYK data corresponds to a region with a density exceeding 100% or a region with a density below 0% (namely, the data is located outside the gamut).

In such a case, in the stage of determining the forward relationship of correspondence in Step 146, the forward relationship of correspondence is determined without performing processing in which CMYK data located outside the gamut is approximated to values falling within the gamut (hereafter, this processing will be referred to as clip processing). Advantages of this will be described below.

Figure 17:
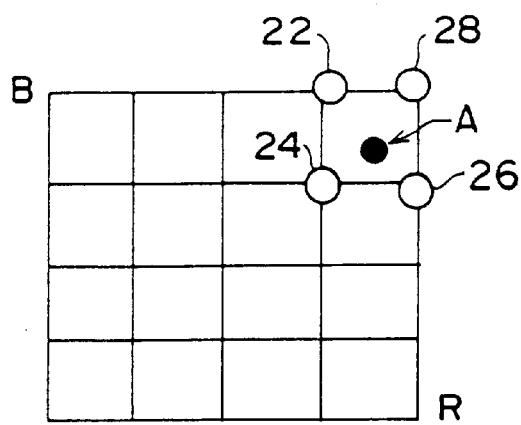
FIG. 17 is a diagram illustrating lattice points and a point subject to transformation in a two-dimensional coordinate system of RB in the case where G data is fixed to a predetermined value in the RGB data.

FIG. 17 illustrates a two-dimensional coordinate system of R data and B data in a case where G data is fixed to a predetermined value in the RGB device space. A case is considered in which the RGB data corresponding to the point A in FIG. 17 is transformed into the CMYK data. At this time, the CMYK data corresponding to the point A is determined by interpolation calculation from the CMYK data after eight lattice points in the neighborhood of the point A in the RGB device space are transformed in Step 106 in FIG. 2 (these lattice points will be hereafter referred to as the relational lattice points of the point A; they are designated at points 22, 24, 26, and 28 in FIG. 4).

FIG. 18A shows CMYK data A1 corresponding to the point A in a case where clip processing is not performed for the lattice points located outside the gamut among the relational lattice points of the point A. FIG. 18B shows CMYK data A2 corresponding to the point A in a case where clip processing is performed for the lattice points located outside the gamut among the relational lattice points of the point A.

As is apparent from a comparison between FIGS. 18A and 18B, if clip processing is performed, the spacing (unfilled circles in FIGS. 18A and 18B) between the pieces of CMYK data corresponding to the relational lattice points of the point A becomes small. For this reason, when the CMYK data corresponding to the RGB data located in the neighborhood of a gamut boundary (100% density) as at the point A is calculated by interpolation calculation, the range of data subject to calculation becomes narrow, so that the resolution declines.

In this second embodiment, in the stage of determining the forward relationship of correspondence (Step 146), clip processing is not performed, and when the RGB data subject to processing is transformed into CMYK data by using the forward relationship of correspondence (Step 106 in FIG. 2), the CMYK data is determined by interpolation from the CMYK data after transformation of the relational lattice points. Therefore, it is possible to avoid a decline in the resolution of the CMYK data corresponding to the vicinity of a gamut boundary.

It should be noted that although the CMYK data A1 corresponding to the point A is obtained as a value falling within the gamut, if the RGB data which corresponds or is very close to a lattice point located outside the gamut is transformed into CMYK data, there are cases where a value falling outside the gamut is obtained. In this case, the value falling outside the gamut is approximated according to a predetermined rule, e.g., to CMYK data on a gamut boundary closest from the value falling outside the gamut in the CMYK device space.

Processing for Constraining K Data and Deriving Inverse Relationship of Correspondence in Step 144

Hereafter, a description will be given of processing for constraining K data and deriving an inverse relationship of correspondence in Step 144. As also described in the column for conventional art, K data has a characteristic that it is equivalently replaced by a gray component which is represented by a predetermined amount of equivalent CMY data. In practice, processing called gray component replace (GCR) is also known in which the aforementioned gray component is actively replaced by K data which can be equivalently replaced by the gray component. Hereafter, processing in which the gray component which can be represented by CMY data is replaced by K data will be referred to as K-version replace.

Hereafter, a description will be given of K-version replace. As advantages of performing K-version replace, it is possible to cite the following three points.

An achromatic color such as gray can be reproduced stably.

The total amount of ink can be reduced, so that the cost of ink can be reduced.

By virtue of the reduction in the total amount of ink, stabilization can be ensured in terms of drying and storage after printing.

On the other hand, as disadvantages of performing K-version replace, it is possible to cite the following two points.

There is a possibility that when a color having high saturation (a high-saturation color) is reproduced, muddiness of color can occur.

The overall ink film pressure decreases, so that there is a possibility that glossiness declines.

Figure 5:
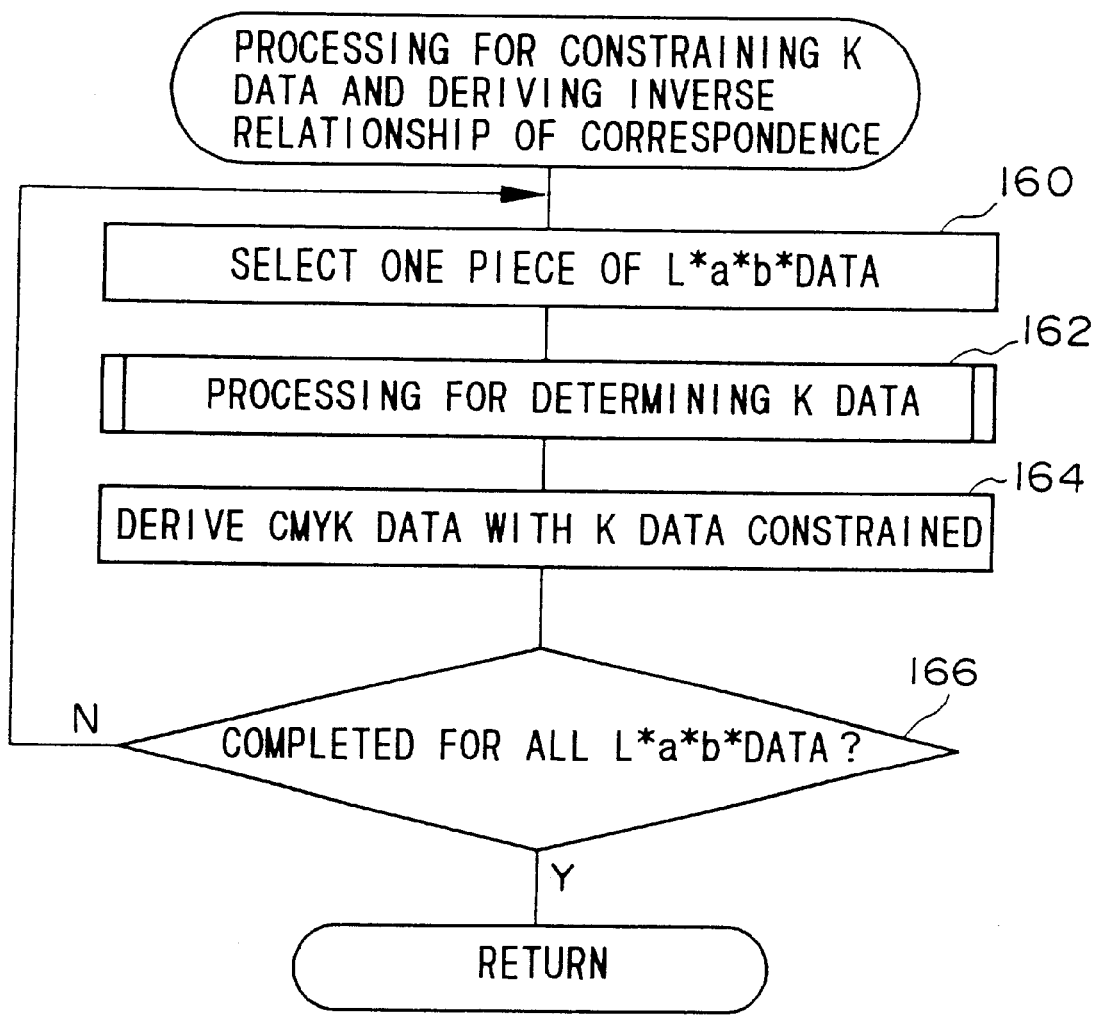
FIG. 5 is a flowchart illustrating a subroutine for processing for constraining K data and deriving an inverse relationship of correspondence.

In Step 144 of FIG. 4, the subroutine shown in FIG. 5 is executed. In Step 160 of FIG. 5, one piece of $L^*a^*b^*$ data is selected from the $L^*a^*b^*$ data made to correspond to in the first relationship of correspondence determined in Step 140 of FIG. 4. In an ensuing Step 162, the subroutine for processing for determination of K data in FIG. 6 is executed.

Figure 6:
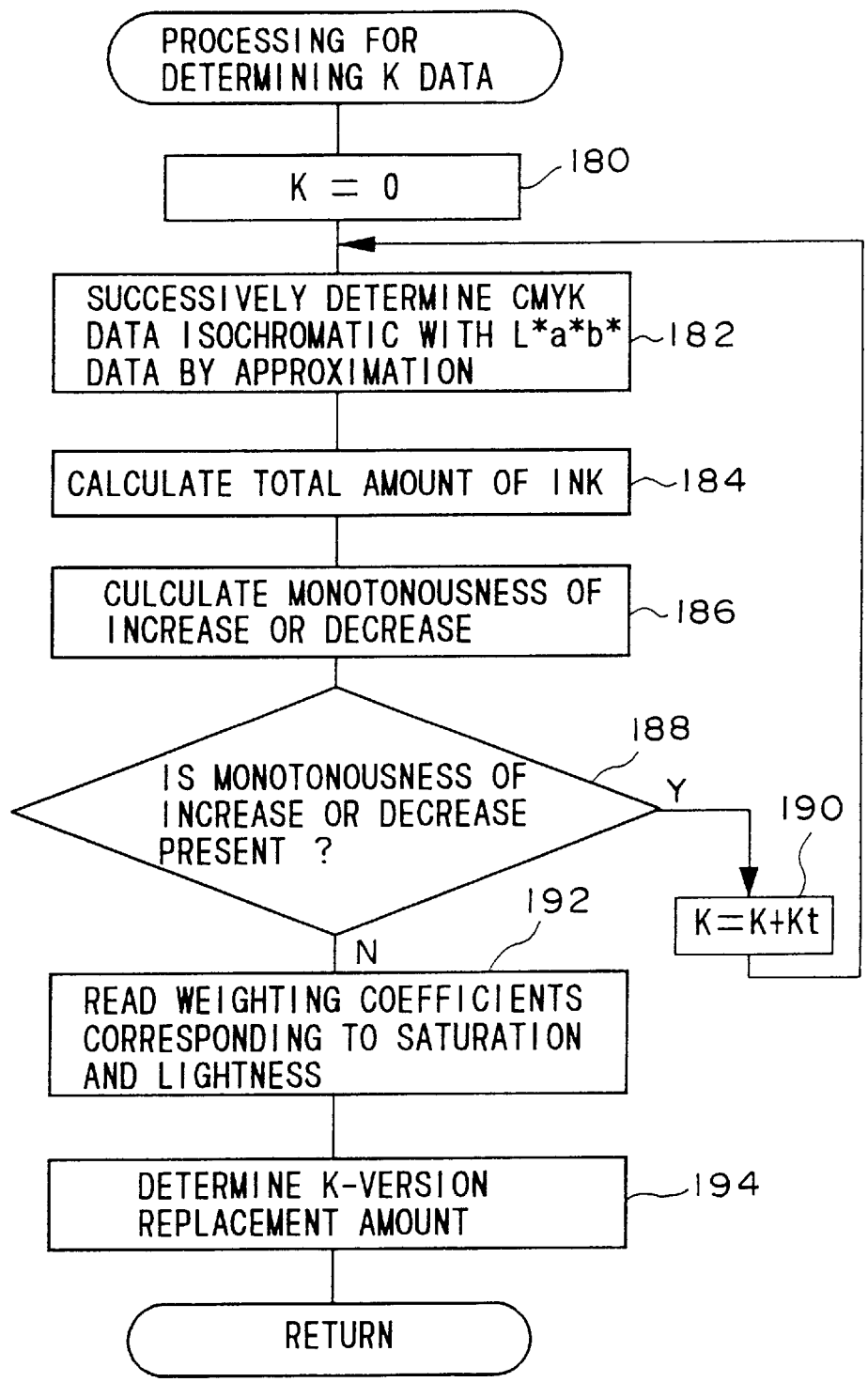
FIG. 6 is a flowchart illustrating a subroutine for processing for determining K data.

First, in Step 180 of FIG. 6, K data is initialized to "0." In an ensuing Step 182, CMYK data corresponding to the $L^*a^*b^*$ data selected above is obtained from the second relationship of correspondence determined in Step 142 of FIG. 4 with the K data set in a constrained state (initially, K data=0) by making use of Newton's successive approximation method in the same way as the above-described first embodiment. At this time, by using as a reference one color (maximum color) constituting a principal gradation among C, M, and Y in the color represented by the $L^*a^*b^*$ data selected above, CMYK data may be determined by successive approximation such that the reference color is kept in linear form down to minimum lightness (dark portion) with respect to change in lightness.

The respective color data of CMYK data correlates to the amount of ink necessary when a corresponding color is reproduced by the printing device. For this reason, in an ensuing Step 184, the total amount of ink $INK_{sum}$ is calculated as the sum of the respective color data of the CMYK data from the following Formula (14).

$$INK_{sum} = \Sigma(C\ data, M\ data, Y\ data, K\ data) \qquad (14)$$

Generally, the larger the K data, the more the amount of CMY data replaced by the K data increases, and the less the total amount of ink $INK_{sum}$. In reality, however, owing to a physical property such as trapping which is known as the transfer balance of ink printed over the ink printed earlier by the printing device, as shown in the graph on the characteristic of the total amount of K data ink in FIG. 8, a portion where the total amount of ink ceases to decrease monotonously with an increase in K data, i.e., a portion (portion indicated by arrow Q) where the change in the total amount of ink reverses, is present.

For this reason, in an ensuing Step 186, the value of Formula (15) below which expresses the monotonousness of increase or decrease in the total amount of ink (an amount of change in the inclination of the graph in FIG. 8) is calculated. In an ensuing Step 188, on the basis of whether or not the thus-calculated value has assumed a predetermined value or more, a determination is made as to whether or not the monotonousness of increase or decrease in the total amount of ink is present.

$$\partial^2 S(L^*, a^*, b^*, (K))/\partial K^2 \qquad (15)$$

It should be noted that S(L*, a*, b*, (K)) represents a function for determining the total amount of ink corresponding to the L*a*b* data.

However, since the as to whether or not the monotonousness of increase or decrease in the total amount of ink is present cannot be made on the first occasion, it is assumed that the monotonousness of increase or decrease in the total amount of ink is present, and the operation proceeds to Step 190. In step 190, K data is increased by a predetermined increment Kt set in advance, and the operation returns to Step 182 in which CMYK data which is isochromatic with the L*a*b* data selected above is determined by successive approximation under the condition of K data increased by the increment Kt. Then, the total amount of ink corresponding to the CMYK data thus determined is calculated (Step 184). Subsequently, the calculation of the value representing the monotonousness of increase or decrease in the total amount of ink (Step 186) and the determination of the presence or absence of the monotonousness of increase or decrease (Step 188) are performed again.

Thus the processing of Steps 182 through 190 is repeated while increasing the K data by the increment Kt until a determination is made in Step 188 that the monotonousness of increase or decrease in the total amount of ink is absent.

If it is determined in Step 188 that the monotonousness of increase or decrease in the total amount of ink is absent, the operation proceeds to Step 192 in which the first weighting coefficient corresponding to the saturation of the color represented by the aforementioned L*a*b* data and the second weighting coefficient corresponding to the lightness of that color are read from the head disk 14. The K data at this point of time (at the point of time when the monotonousness of increase or decrease in the total amount of ink has become absent) is the K data corresponding to the portion indicated by arrow Q in the graph of FIG. 8, and it is possible to minimize the total amount of ink $INK_{sum}$ by replacing the CMY data by using this K data.

Accordingly, in an ensuing Step 194, the K data (the amount of K-version replacement) is determined by weighting the K data persisting at the point of time when the monotonousness of increase or decrease in the total amount of ink has become absent, by using the first weighting coefficient and the second weighting coefficient.

As for the first weighting coefficient, its value is maximal when the saturation C* of the color represented by the L*a*b* data is 0 (when it is gray), and the value becomes smaller as the absolute value of saturation C* becomes larger, as shown in FIG. 7A. As for the second weighting coefficient, the lower the lightness L* of the color, the larger its value becomes, as shown in FIG. 7B. Accordingly, in the case of a color having high saturation, since the first weighting coefficient becomes small, the K data is determined to be a small value. For this reason, it is possible to avoid the occurrence of muddiness when a color having high saturation is reproduced. In addition, in the case of a color whose lightness and saturation are low, since the first and second weighting coefficients become large, the K data is determined to be a large value. For this reason, the color whose lightness and saturation are low can be reproduced stably. Thus, the K data can be determined appropriately in correspondence with the lightness and saturation of the color corresponding to the colorimetric values.

Figure 8:
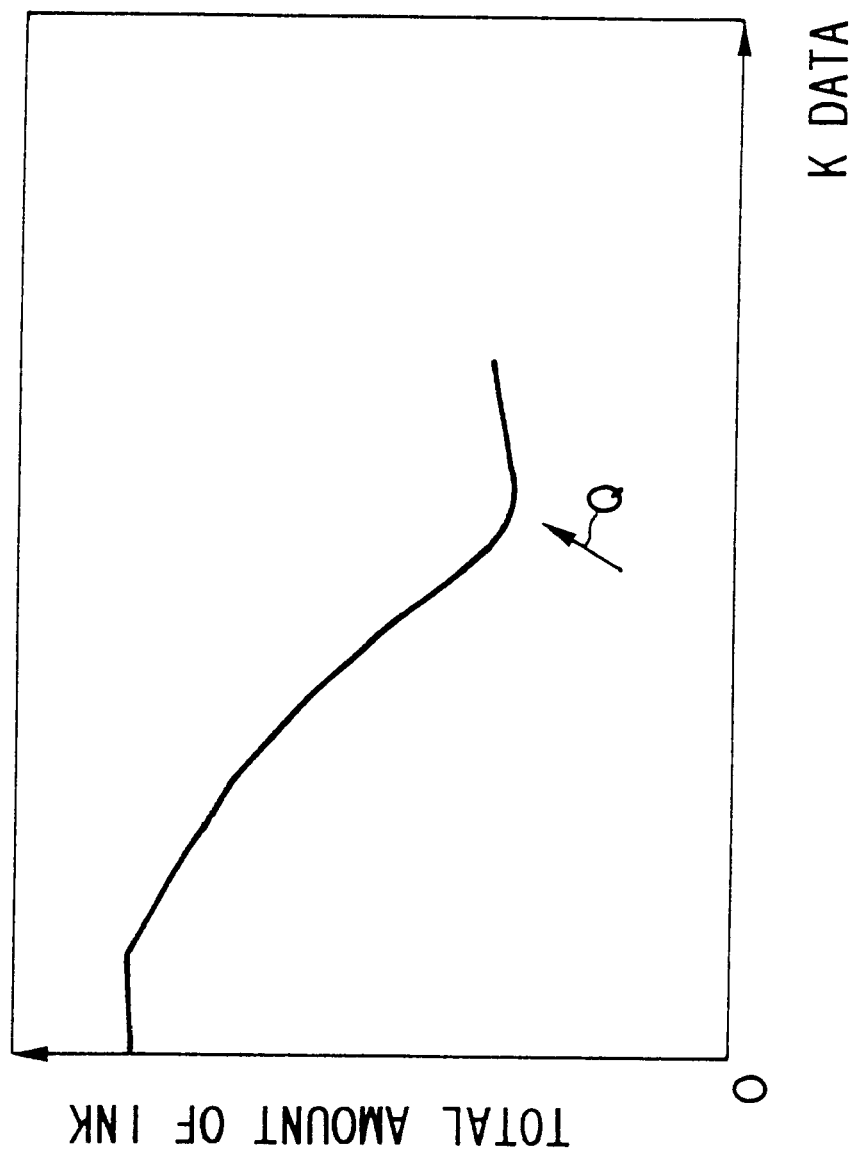
FIG. 8 is a graph illustrating a characteristic of the relationship between K data and the total amount of ink.

It should be noted that, if the point where the monotonousness of increase or decrease in the total amount of ink becomes absent (the portion indicated by arrow Q) in the graph of FIG. 8 is known in advance, processing in Steps 180 through 190 may be omitted in the processing for determination of K data, and the K data (K-version replacement amount) may be determined by reading the first weighting coefficient corresponding to the saturation of the color represented by the L*a*b* data and the second weighting coefficient corresponding to the lightness of that color in Step 192, and by weighting the already known K data persisting at the point of time when the monotonousness of increase or decrease in the total amount of ink has become absent, by using the first weighting coefficient and the second weighting coefficient.

After the K data corresponding to the L*a*b* data selected in Step 160 above is thus determined in Step 162 of FIG. 5, in an ensuing Step 162, after the K data is constrained to the determined value, the CMYK data corresponding to the aforementioned L*a*b* data is derived.

Subsequently, processing in the aforementioned Steps 160 to 164 of FIG. 5 is consecutively executed one piece of data at a time with respect to all the L*a*b* data made to correspond to in the first relationship of correspondence. Then, upon completion of processing in Steps 160 to 164 with respect to all the L*a*b* data, the subroutine in FIG. 5 ends. At this time, CMYK data corresponding to the respective L*a*b* data made to correspond to in the first relationship of correspondence have been obtained.

By executing the above-described processing for constraining K data and deriving an inverse relationship of correspondence in Step 144, the inverse relationship of correspondence from the L*a*b* data to the CMYK data can be determined univalently after the K data is constrained appropriately.

As described above, in the second embodiment, the forward relationship of correspondence from the RGB data to the CMYK data is determined, and FIG. 9 shows a graph which illustrates correspondence from RGB data (RGB data in which R=G=B) corresponding to gray to the respective data (density values) of CMYK. In FIG. 9, the broken lines show the results of mapping from RGB data to CMYK data in a transformation based on a conventional general method (relative colorimetric method), while solid lines show the forward relationship of correspondence determined in this embodiment.

As is apparent from FIG. 9, the forward relationship of correspondence determined in this embodiment makes it possible to reproduce the gray gradation linearly more up to the high-density side. In addition, it can be seen that the RGB data is made to correspond to the CMYK data in a maximum density range of from 0% to 100%.

Figure 11:
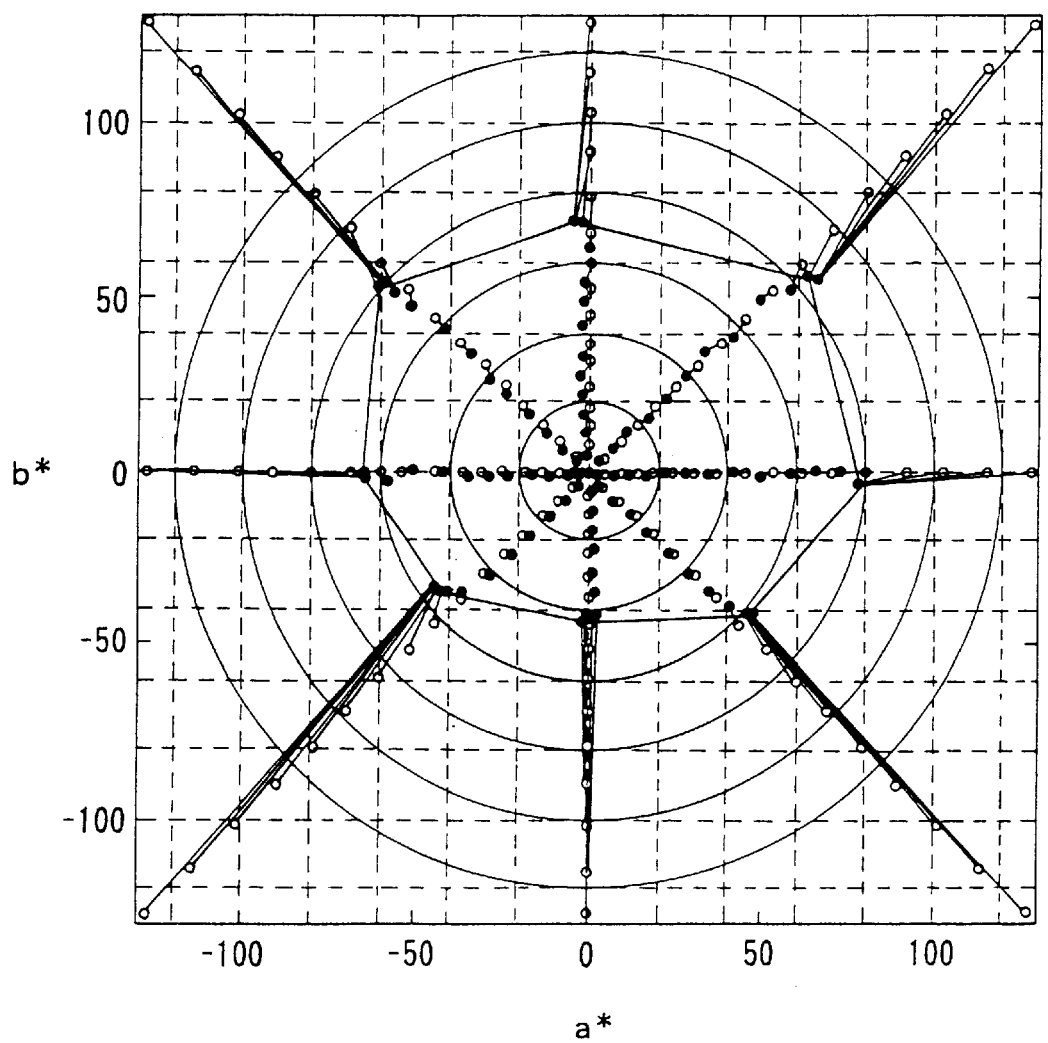
FIG. 11 is a cross-sectional view of $L^*=50$ in the $L^*a^*b^*$ color space, illustrating the relationship of correspondence between the source RGB data and the target CMYK data in accordance with a conventional method.
Figure 19:
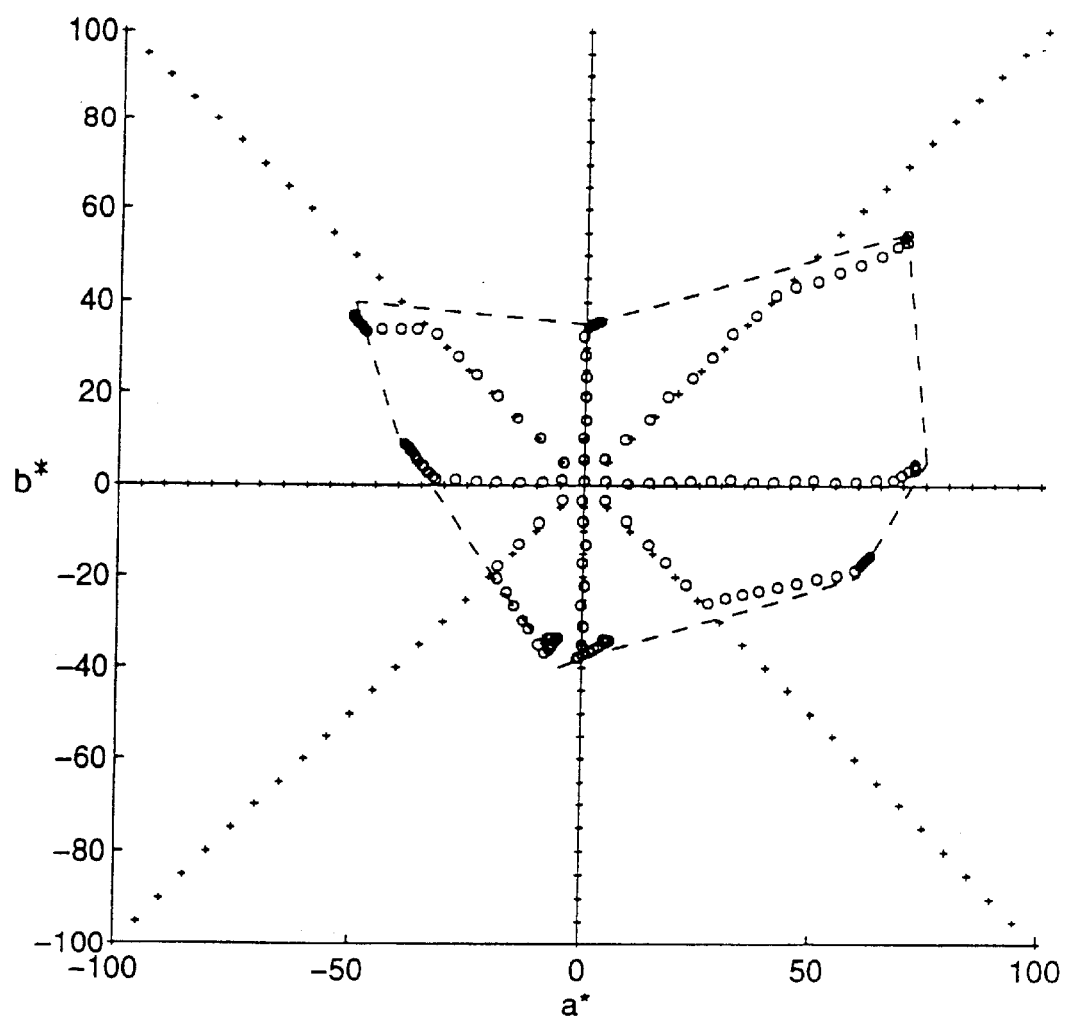
FIG. 19 is a diagram illustrating target CMYK data and a boundary of the gamut which were obtained by additionally conducting an test similar to that of FIG. 10.

Further, FIG. 10 shows the relationship of correspondence between the source RGB data (unfilled circles) and the target CMYK data (filled circles) in this embodiment, while FIG. 11 shows the relationship of correspondence between the source RGB data (unfilled circles) and the target CMYK data (filled circles) in a conventional method, the drawings being cross-sectional views of L*=50 in the L*a*b* color space, respectively. In the respective drawings, approximate positions of the boundaries of the gamut in the CMYK device space are indicated by the solid lines. It should be noted that FIG. 19 shows the distribution of the CMYK data (unfilled circles) transformed into, which was obtained by conducting a similar additional test, and the boundary line of the gamut is indicated by the broken lines.

As is apparent from a comparison between FIGS. 10 and 11, in the conventional method, a plurality of different pieces of RGB data corresponding to a region outside the gamut of the CMYK device space tend to degenerate in particular locations, whereas, in this embodiment, such RGB data respectively correspond in a dispersed manner to a plurality of different points in the vicinities of the boundary of the gamut. In other words, although, in the conventional method, a plurality of different pieces of RGB data are transformed into substantially the same CMYK data, in this embodiment, a plurality of different pieces of RGB data are respectively transformed into different pieces of CMYK data, and differences between the source data are preserved.

Figure 12:
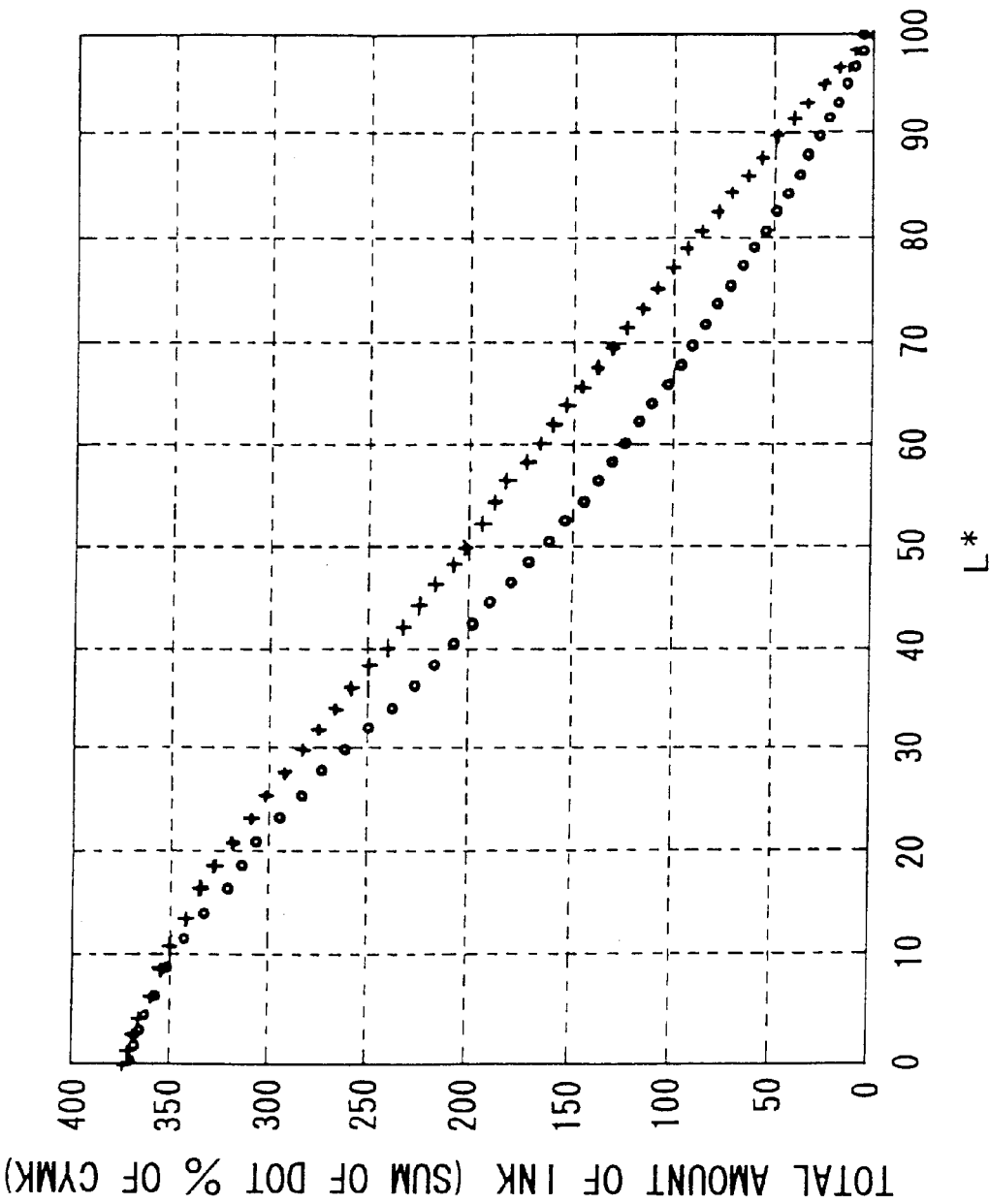
FIG. 12 is a graph in which correspondence is plotted between the lightness $L^*$ of a color and the total amount of ink necessary for allowing the color to be reproduced by a printing device.

FIG. 12 shows a graph in which correspondence is plotted between the L* value (lightness) of L*a*b* data corresponding to RGB data, on the one hand, and the total amount of ink necessary for allowing the CMYK data obtained from the RGB data by transformation to be reproduced by a printing device. From FIG. 12, it can be appreciated that, in the case of this embodiment, the total amount of ink changes more linearly with respect to an increase or decrease of the L* value than in the case of the conventional method. This means that the total amount of ink changes more linearly with respect to an increase or decrease in the color density, and when the CMYK data obtained by the transformation is reproduced by the printing device, it is possible to expect more stable reproduction.

It should be noted that the image processor in accordance with the first and second embodiments is not limited to a stand-alone type computer such as the one shown in FIG. 1, and may be a computer connected to a network. Further, if the image processor is configured by the computer connected to the network, the RGB data before transformation and the CMYK data after transformation may be stored in a storage device managed by a file server connected to the computer through the network.

In addition, although, in the foregoing embodiments, the color transformation program is stored in the floppy disk, the present invention is not limited to the same, and the color transformation program may be stored in a ROM. Further, the computer body may be provided with a hard disk, and the color transformation program may be read from the floppy disk and may be installed in the hard disk. Furthermore, color transformation program may be transmitted to a wired or wireless network through a transmitting means such as a telephone line or the like and may be installed. It should be noted that the color transformation program is not limited to being stored in the floppy disk, and may be stored in a CD-ROM or a magnetic tape, and may be installed in the hard disk of the personal computer from the CD-ROM or the magnetic tape. In addition, the program may be directly written into the hard disk or the RAM of the personal computer. Thus, the aforementioned program can be circulated by at least one of a concrete recording medium or a transmitting means.

What is claimed is:

1. A color transformation method for transforming device data in a first device space represented by a first color system into device data in a second device space represented by a second color system in which a number of dimensions is different from said first color system, comprising the steps of:

determining a first relationship of correspondence from the device data in said first device space to color information of a third color system different from said first and said second color systems and a second relationship of correspondence from the device data in said second device space to the color information of said third color system;

constraining any element in the second color system using a predetermined condition and determining an inverse relationship of correspondence from the color information of said third color system to the device data in said second device space on the basis of said second relationship of correspondence;

determining a forward relationship of correspondence from the device data in said first device space to the device data in said second device space on the basis of said first relationship of correspondence and said inverse relationship of correspondence; and transforming the device data in said first device space into device data in said second device space by using said forward relationship of correspondence determined.

2. A color transformation method for transforming device data in a first device space represented by a first color system into device data in a second device space represented by a second color system in which a number of dimensions is different from said first color system, comprising the steps of:

determining a first relationship of correspondence from the device data in said first device space to color information of a third color system different from said first and said second color systems and a second relationship of correspondence from the device data in said second device space to the color information of said third color system;

determining an inverse relationship of correspondence from the color information of said third color system to the device data in said second device space on the basis of said second relationship of correspondence;

determining a forward relationship of correspondence from the device data in said first device space to the device data in said second device space on the basis of said first relationship of correspondence and said inverse relationship of correspondence; and transforming the device data in said first device space into device data in said second device space by using said forward relationship of correspondence determined, wherein a determination is made as to whether said forward relationship of correspondence from the device data in said first device space to the device data in said second device space has already been determined, and in cases where it is determined that said forward relationship of correspondence has already been determined, the device data in said first device space is directly transformed into the device data in said second device space by using the forward relationship of correspondence determined.

3. A color transformation method for transforming device data in a first device space represented by an RGB color system into device data in a second device space represented by a CMYK color system, comprising the steps of:

determining a first relationship of correspondence from the device data in said first device space to color information of a third color system different from said RGB color system and said CMYK color system and a second relationship of correspondence from the device data in said second device space to the color information of said third color system;

determining an inverse relationship of correspondence from the color information of said third color system to the device data in said second device space on the basis of said second relationship of correspondence, after K data of the device data in said second device space is constrained under a predetermined condition;

determining a forward relationship of correspondence from the device data in said first device space to the device data in said second device space on the basis of said first relationship of correspondence and said inverse relationship of correspondence; and transforming the device data in said first device space into device data in said second device space by using said forward relationship of correspondence determined.

4. The color transformation method according to claim 3, wherein a determination is made as to whether said forward relationship of correspondence from the device data in said first device space to the device data in said second device space has already been determined, and in cases where it is determined that said forward relationship of correspondence has already been determined, the device data in said first device space is directly transformed into the device data in said second device space by using the forward relationship of correspondence determined.

5. The color transformation method according to claim 3, wherein said predetermined condition is a condition that the lower the lightness and saturation of a color corresponding to the color information of said third color system, the more the K data is increased.

6. A color transformation program for a computer to execute processing for transforming device data in a first device space represented by a first color system into device data in a second device space represented by a second color system in which a number of dimensions is different from said first color system, wherein said color transformation program causes said computer to determine a first relationship of correspondence from the device data in said first device space to color information of a third color system different from said first and said second color systems and a second relationship of correspondence from the device data in said second device space to the color information of said third color system; constrain any element in the second color system using a predetermined condition and determine an inverse relationship of correspondence from the color information of said third color system to the device data in said second device space on the basis of said second relationship of correspondence;

determine a forward relationship of correspondence from the device data in said first device space to the device data in said second device space on the basis of said first relationship of correspondence and said inverse relationship of correspondence; and transform the device data in said first device space into device data in said second device space by using said forward relationship of correspondence determined.

7. A recording medium incorporating the color transformation program as recited in claim 6.

8. A color transformation program for a computer to execute processing for transforming device data in a first device space represented by a first color system into device data in a second device space represented by a second color system in which a number of dimensions is different from said first color system, wherein said color transformation program causes said computer to determine a first relationship of correspondence from the device data in said first device space to color information of a third color system different from said first and said second color systems and a second relationship of correspondence from the device data in said second device space to the color information of said third color system;

determine an inverse relationship of correspondence from the color information of said third color system to the device data in said second device space on the basis of said second relationship of correspondence;

determine a forward relationship of correspondence from the device data in said first device space to the device data in said second device space on the basis of said first relationship of correspondence and said inverse relationship of correspondence; and transform the device data in said first device space into device data in said second device space by using said forward relationship of correspondence determined, wherein said color transformation program causes said computer to determine whether said forward relationship of correspondence from the device data in said first device space to the device data in said second device space has already been determined, and in cases where it is determined that said forward relationship of correspondence has already been determined, directly transform the device data in said first device space into the device data in said second device space by using the forward relationship of correspondence determined.

9. A color transformation program for a computer to execute processing for transforming device data in a first device space represented by an RGB color system into device data in a second device space represented by a CMYK color system, wherein said color transformation program causes said computer to determine a first relationship of correspondence from the device data in said first device space to color information of a third color system different from said RGB color system and said CMYK color system and a second relationship of correspondence from the device data in said second device space to the color information of said third color system;

determine an inverse relationship of correspondence from the color information of said third color system to the device data in said second device space on the basis of said second relationship of correspondence, after K data of the device data in said second device space is constrained under a predetermined condition;

determine a forward relationship of correspondence from the device data in said first device space to the device data in said second device space on the basis of said first relationship of correspondence and said inverse relationship of correspondence; and transform the device data in said first device space into device data in said second device space by using said forward relationship of correspondence determined.

10. A recording medium incorporating the color transformation program as recited in claim 9.

11. The color transformation program according to claim 9, wherein said color transformation program causes said computer to determine whether or not said forward relationship of correspondence from the device data in said first device space to the device data in said second device space has already been determined, and in cases where it is determined that said forward relationship of correspondence has already been determined, directly transform the device data in said first device space into the device data in said second device space by using the forward relationship of correspondence determined.

12. The color transformation program according to claim 9, wherein said predetermined condition is a condition that the lower the lightness and saturation of a color corresponding to the color information of said third color system, the more the K data is increased.

13. A method of determining a forward relationship of correspondence from a device data in a first device space to a device data in a second device space in which a number of dimensions is different from the number of dimensions of the first device space, comprising:

determining a first relationship of correspondence from the device data in said first device space to color information of a third color system different from said first and said second device spaces and a second relationship of correspondence from the device data in said second device space to the color information of said third color system;

constraining any element in a second color system of said second device space using a predetermined condition and determining an inverse relationship of correspondence from the color information of said third color system to the device data in said second device space on the basis of said second relationship of correspondence; and determining a forward relationship of correspondence from the device data in said first device space to the device data in said second device space on the basis of said first relationship of correspondence and said inverse relationship of correspondence.

14. A method of determining a forward relationship of correspondence from a device data in a first device space represented by an RGB color system to device data in a second device space represented by a CMYK color system, comprising:

determining a first relationship of correspondence from the device data in said first device space to color information of a third color system different from said RGB color system and said CMYK color system and a second relationship of correspondence from the device data in said second device space to the color information of said third color system;

determining an inverse relationship of correspondence from the color information of said third color system to the device data in said second device space on the basis of said second relationship of correspondence, after K data of the device data in said second device space is constrained under a predetermined condition; and determining a forward relationship of correspondence from the device data in said first device space to the device data in said second device space on the basis of said first relationship of correspondence and said inverse relationship of correspondence.

15. A program to determine a forward relationship of correspondence from a first color system to a second color system in which a number of dimensions is different than the first color system, the program executable by a data processor and comprised of instructions configured to:

determine a first relationship of correspondence from device data in said first color system to color information of a third color system different from said first and said second color systems and a second relationship of correspondence from device data in said second color system to color information of said third color system;

constrain any element in the second color system using a predetermined condition and determine an inverse relationship of correspondence from the color information of said third color system to the device data in said second color system on the basis of said second relationship of correspondence; and determine a forward relationship of correspondence from the device data in said first color system to the device data in said second color system on the basis of said first relationship of correspondence and said inverse relationship of correspondence.

16. A computer readable medium incorporating the program of claim 15.

17. A program to determine a forward relationship of correspondence from a first device space represented by an RGB color system to a second device space represented by a CMYK color system different than the first color system, the program executable by a data processor and comprised of instructions configured to:

determine a first relationship of correspondence from the device data in said first device space to color information of a third color system different from said RGB color system and said CMYK color system and a second relationship of correspondence from the device data in said second device space to the color information of said third color system;

determine an inverse relationship of correspondence from the color information of said third color system to the device data in said second device space on the basis of said second relationship of correspondence, after K data of the device data in said second device space is constrained under a predetermined condition; and determine a forward relationship of correspondence from the device data in said first device space to the device data in said second device space on the basis of said first relationship of correspondence and said inverse relationship of correspondence.

18. A computer readable medium incorporating the program of claim 17.

* * * * *